US012808993B2

(12) United States Patent
Li et al.

(10) Patent No.: US 12,808,993 B2
(45) Date of Patent: Nov. 24, 2026

(54) LASER BEAM EMISSION MODULE AND LIDAR

(71) Applicant: SUTENG INNOVATION TECHNOLOGY CO., LTD., Shenzhen (CN)

(72) Inventors: Kunyi Li, Shenzhen (CN); Kaipeng Zhang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 715 days.

(21) Appl. No.: 18/214,515

(22) Filed: Jun. 26, 2023

(65) Prior Publication Data

US 2024/0004036 A1 Jan. 4, 2024

(51) Int. Cl.
*G01S 7/481* (2006.01)

(52) U.S. Cl.
CPC .......... *G01S 7/4815* (2013.01); *G01S 7/4813* (2013.01)

(58) Field of Classification Search
CPC ...... G01S 7/4815; G01S 7/4814; G01S 7/484; G01S 7/481; G01S 17/88; G01S 7/4817; G02B 26/08; G02B 27/30; G02B 27/0955; G02B 23/02; G02B 6/4206
See application file for complete search history.

(56) References Cited

U.S. PATENT DOCUMENTS

2020/0041614 A1* 2/2020 Donovan .............. G01S 7/4813

FOREIGN PATENT DOCUMENTS

CN 109188451 A * 1/2019 ............. G01S 17/08
CN 111323786 A 6/2020
CN 113156460 A * 7/2021 ........... G01S 17/894

OTHER PUBLICATIONS

CN-109188451-A (Year: 2019).*
CN-113156460-A (Year: 2021).*
First Office Action issued in related Chinese Application No. 202210763392.1, mailed May 8, 2024, 11 pages.

* cited by examiner

*Primary Examiner* — Sanjiv D. Patel
(74) *Attorney, Agent, or Firm* — BAYES PLLC

(57) ABSTRACT

Embodiments of this application disclose a laser beam emission module and a LiDAR. The laser beam emission module includes: multiple light emission modules, where each light emission module is configured to emit an emission laser beam group, and the emission laser beam group includes multiple emission laser beams; an emission lens module, located on a light outgoing side of the multiple light emission modules, configured to reduce a divergence angle of the emission laser beams emitted by the multiple light emission modules, and further configured to increase an emission angle of view of the emission laser beams; and a light beam adjustment module, located on a light outgoing side of the emission lens module and configured to adjust an interval between angles of view of emission laser beams output by the emission lens module.

10 Claims, 19 Drawing Sheets

LASER BEAM EMISSION MODULE AND LIDAR

CROSS-REFERENCE TO RELATED APPLICATION

The present application claims the benefit of priority to Chinese Patent Application No. 202210763392.1, filed on Jun. 30, 2022, which is hereby incorporated by reference in its entirety.

TECHNICAL FIELD

This application relates to the field of optical technologies, and in particular, to a laser beam emission module and a LiDAR.

BACKGROUND

A LiDAR is a radar system that emits a laser beam to detect characteristics such as position, speed, or the like of a target. The LiDAR includes a laser beam emission module, a laser beam receiving module, and a signal processing module. The laser beam emission module is configured to emit an emission laser beam to a target object, the laser beam receiving module is configured to receive an echo laser beam reflected by the target object and output a corresponding electrical signal, and after the signal processing module processes the electrical signal to obtain information including distance, azimuth, height, speed, attitude, shape, or other parameters of the target object, thereby implementing a detection function.

Currently, the laser beam emission module can include a laser illuminating module and a laser beam emission lens and the laser illuminating module includes multiple lasers for emitting divergent beams. The laser beam emission lens is on a light outgoing side of the laser illuminating module, and is configured to receive divergent beams emitted by multiple lasers and emit detection beams to detected space.

How to improve an emission angle of view for the laser beam emission module has become a technical problem that needs to be resolved.

SUMMARY

Embodiments of this application provide a laser beam emission module and a LiDAR, so that an interval between angles of view of every two adjacent emission laser beams in the entire emission angle of view is less than or equal to a preset value, thereby avoiding a large blind spot in a field of view and improving a detection effect of the LiDAR. Technical solutions are as follows.

According to a first aspect, embodiments of this application provide a laser beam emission module, including: multiple light emission modules, where each light emission module is configured to emit an emission laser beam group, and each emission laser beam group includes multiple emission laser beams; an emission lens module, located on a light outgoing side of the multiple light emission modules, configured to reduce a divergence angle of the emission laser beams emitted by the multiple light emission modules, and further configured to increase an emission angle of view of the emission laser beams; and a light beam adjustment module, located on a light outgoing side of the emission lens module and configured to adjust an interval between angles of view of all or some of emission laser beams output by the emission lens module, so that an interval between angles of view of every two adjacent emission laser beams is less than or equal to a preset value.

According to a second aspect, embodiments of this application provide a LiDAR, including: at least one group of the foregoing laser beam emission modules; and a laser beam receiving module, configured to receive an echo laser beam formed after an emission laser beam sent by the laser beam emission module is reflected by a target object.

Based on the laser beam emission module and the LiDAR in the embodiments of this application, the light beam adjustment module is disposed, so that an interval between angles of view of every two adjacent emission laser beams in the entire emission angle of view of the laser beam emission module can be less than or equal to a preset value, thereby avoiding a large blind spot in a field of view in the entire emission angle of view and improving the detection effect of the LiDAR.

BRIEF DESCRIPTION OF DRAWINGS

To explain embodiments of the present application more clearly, the following briefly introduces the drawings. Obviously, the drawings in the following description are only some embodiments of the present application.

Figure 1:
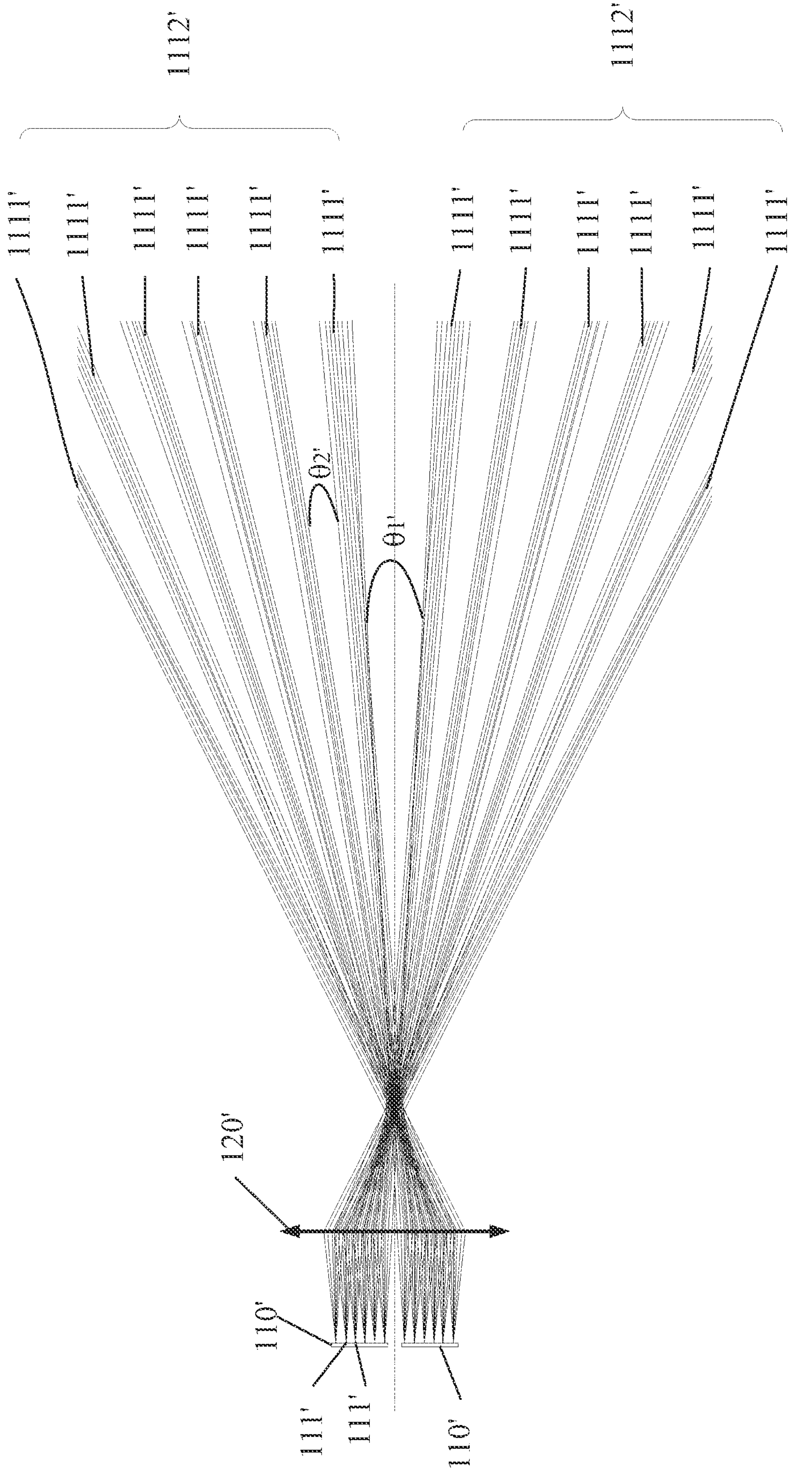
FIG. 1 is a schematic structural diagram of a laser beam emission module (excluding a light beam adjustment module) according to an embodiment of this application.

Reference signs: 10—LiDAR; 100—laser beam emission module; 110—light emission module; 111—light emission unit; 1111—emission laser beam; 1111*a*1—edge emission laser beam; 1111*a*2—secondary edge emission laser beam; 1111*b*1—edge emission laser beam; 1111*c*—middle emission laser beam; 1112—emission laser beam group; 1112*a*—first emission laser beam group; 1112*b*—second emission laser beam group; 120—emission lens module; 130—light beam adjustment module; 131—refractive optical structure; 1311—refraction portion; 132—light uniformizing structure; 1321—light uniformizing portion; 1322—first portion; 1323—second portion; 200—laser beam receiving module; x—first direction; and y—second direction.

DETAILED DESCRIPTION

To make objectives, technical solutions, and advantages of the present application clearer, embodiments of the present application are described in further detail below with reference to the drawings.

When the following description refers to the drawings, unless otherwise indicated, the same numbers in different drawings indicate the same or similar elements. The implementation described in the following exemplary embodiments do not represent all implementations consistent with the present application. On the contrary, the implementation is merely examples of devices and methods consistent with some aspects of the present application as detailed in the appended claims.

As shown in FIG. 1, FIG. 2, FIG. 3, FIG. 9, FIG. 13, and FIG. 14, the laser beam emission module 100 provided in embodiments of this application includes: multiple light emission modules 110, where each light emission module 110 is configured to emit an emission laser beam group 1112, and each emission laser beam group 1112 includes multiple emission laser beams 1111; and an emission lens module 120, located on a light outgoing side of the multiple light emission modules 110, configured to reduce a divergence angle of the emission laser beams 1111 emitted by the multiple light emission modules 110, and further configured to increase an emission angle of view of the emission laser beams 1111.

Specifically, "multiple" refers to "two or more than two" (hereinafter the same). Each light emission module 110 includes multiple light emission units arranged at intervals, and each light emission unit 111 can be configured to emit an emission laser beam 1111; and multiple emission laser beams 1111 emitted by multiple light emission units 111 corresponding to each light emission module 110 can form an emission laser beam group 1112, so that an outgoing laser beam emitted by the laser beam emission module 100 is within a specific outgoing angle range. For example, the light emission module 110 includes six light emission units 111, and six emission laser beams 1111 emitted by all the six light emission units 111 of the same light emission module 110 form an emission laser beam group 1112.

In some embodiments, the light emission module 110 may be Vertical-Cavity Surface-Emitting Laser (VCSEL). In some embodiments, the light emission module 110 can be another type of laser, for example, an LD light source, provided that multiple light emission units 11 are arranged at intervals on an emission plane of the light emission module 110. A specific type of laser used for the light emission module 110 is not limited herein.

In some embodiments, multiple light emission modules 110 are arranged at intervals along the first direction and/or the second direction; and when the multiple light emission modules 110 are arranged at intervals along the first direction, after the multiple emission laser beam groups 1112 emitted by the multiple light emission modules 110 are subject to angle narrowing (divergence angle narrowing) and beam expansion (angle of view expansion) by the emission lens module 120, emission fields of view of the multiple light emission modules 110 are spliced along the first direction; when the multiple light emission modules 110 are arranged at intervals along the second direction, after the multiple emission laser beam groups 1112 emitted by the multiple light emission modules 110 are subject to angle narrowing (divergence angle narrowing) and beam expansion (angle of view expansion) by the emission lens module 120, emission fields of view of the multiple light emission modules 110 are spliced along the second direction; or when the multiple light emission modules 110 are arranged at intervals along the first direction and the second direction, after the multiple emission laser beam groups 1112 emitted by the multiple light emission modules 110 are subject to angle narrowing (divergence angle narrowing) and beam expansion (angle of view expansion) by the emission lens module 120, emission fields of view of the multiple light emission modules 110 are spliced along both the first direction and the second direction. Compared with some related arts of emitting light by using individual light emission modules of the same size, the laser beam emission module provided in embodiments of this application emits light by using multiple light emission modules to splice emission fields of view of the laser beam emission module in the first direction and/or the second direction, thereby expanding the emission field of view of the laser beam emission module along the first direction and/or the second direction. In addition, compared with some other related arts that greatly increase power and costs of the individual light emission module and cause a difficulty in implementing hardware drive due to enlargement of a size of the individual light emission module and enlargement of an emission field of view of the laser beam emission module, the laser beam emission module provided in this application emits light by using multiple light emission modules to splice emission fields of view of the laser beam emission module in the first direction and/or the second direction, which can effectively reduce the power and costs of the individual emission module, and can also facilitate operation of related hardware drive and also facilitate adjustment of a position and a light emission effect of the individual emission module, thereby easily ensuring uniform distribution of light emitted by the multiple emission modules.

In some embodiments, the first direction is a vertical direction, and the second direction is a horizontal direction; or the first direction is the horizontal direction, and the second direction is the vertical direction.

Further, in the laser beam emission module 100 provided in this application, multiple light emission modules 110 are disposed on one emission board; and drive circuits corresponding to the multiple light emission modules 110 are disposed on the emission board, and the drive circuit is configured to provide a drive signal for the multiple light emission modules 110 to drive the multiple light emission modules 110 to emit light. With the drive circuits disposed, a distance between the two adjacent light emission modules 110 is much greater than a distance between two adjacent light emission units 111 in the individual light emission module 110, and as a result, an interval θ1' between angles of view of two emission laser beam groups 1112' corresponding to two adjacent light emission modules 110' is far greater than an interval θ2' between angles of view of two adjacent emission laser beams 1111' in an emission laser beam group 1112' corresponding to an individual light emission module 110. In this case, because the interval θ1' between the angles of view of the two adjacent emission laser beam groups 1112' is larger, in the emission field of view of the laser beam emission module 100, a larger blind spot appears at the interval θ1' between the angles of view of the two adjacent emission laser beam groups 1112', thereby affecting a detection effect in the entire detection field of view.

As shown in FIG. 1, a laser beam emission module 100 including two light emission modules 110 arranged at intervals along the first direction is used as an example. The two light emission modules 110 are configured to emit two emission laser beam groups 1112, and the two emission laser beam groups 1112 both include multiple emission laser beams 1111; and because a distance between the two light emission modules 110 is much greater than a distance between two adjacent light emission units 111 in the individual light emission module 110, and as a result, an interval θ1' between angles of view of two adjacent emission laser beam groups 1112' is greater than an interval θ2' between angles of view of two adjacent emission laser beams 1111' in an emission laser beam group 1112' corresponding to an individual light emission module 110'.

As shown in FIG. 2, FIG. 3, FIG. 9, FIG. 13, and FIG. 14, the laser beam emission module 100 provided in embodiments of this application further includes a light beam adjustment module 130. The light beam adjustment module 130 is located on a light outgoing side of the emission lens module 120 and configured to adjust an interval between angles of view of all or some of emission laser beams output by the emission lens module, so that an interval between angles of view of every two adjacent emission laser beams is less than or equal to a preset value. Herein, the preset value can be close to or equal to the interval between angles of view of every two adjacent emission laser beams in an emission laser beam group corresponding to an individual light emission module 110, to resolve a problem of affecting the detection effect in the entire detection field of view when a larger blind spot appears because the interval θ1' between the angles of view of the two emission laser beam groups 1112' of two corresponding light emission modules 110 is excessively large.

Further, the light beam adjustment module 130 performs angle deflection and/or light spot expansion on all or some of emission laser beams 1111 output by the emission lens module 120, so that the interval between the angles of view of every two adjacent emission laser beams 1111 in all the emission laser beams 1111 output by the laser beam emission module 100 is less than or equal to the preset value. That is, after the light beam adjustment module 130 performs processing, the interval between the angles of view of every two adjacent emission laser beams 1111 in an entire emission angle of view of the laser beam emission module 100 can be less than or equal to the preset value, to resolve a problem of affecting the detection effect in the entire detection field of view when a larger blind spot appears because the interval θ1' between the angles of view of the two emission laser beam groups 1112' of two corresponding emission modules 110 is excessively large.

The preset value can be a range preset when a system is designed. Fax example, in an emission laser beam group corresponding to one emission module 110, the interval between the angles of view of two adjacent emission laser beams is 0.34°. The preset value can be 0.32°, 0.33°, 0.34°, 0.35°, and other values. Further, the preset value can be any value between 0° and 0.4°. It can be understood that the preset value is less than the interval θ1' between the angles of view of the two adjacent emission laser beam groups 1112' that are not processed by the light beam adjustment module 130. The interval between the angles of view of the two emission laser beams in multiple emission laser beam groups corresponding to the multiple light emission modules adjusted by the light beam adjustment module 130 is close to or equal to the interval θ2' between angles of view of two adjacent emission laser beams 1111' in an emission laser beam group 1112' corresponding to an individual light emission module 110'.

In some exemplary embodiments, the multiple light emission modules 110 are arranged at intervals along the first direction and/or the second direction. When the multiple light emission modules 110 are arranged at intervals along the first direction, the light beam adjustment module 130 is configured to perform angle deflection and/or light spot expansion on all or some of emission laser beam groups 1112 of corresponding multiple light emission modules 110 that are output by the emission lens module 120 along the first direction x, to reduce an interval between angles of view of two adjacent emission laser beam groups 1112 along the first direction, so that intervals are all less than or equal to a preset value. When the multiple light emission modules 110 are arranged at intervals along the second direction, the light beam adjustment module 130 is configured to perform angle deflection and/or light spot expansion on all or some of emission laser beam groups 1112 of corresponding multiple light emission modules 110 that are output by the emission lens module 120 along the second direction, to reduce an interval between angles of view of two adjacent emission laser beam groups 1112 along the second direction, so that intervals are all less than or equal to a preset value. When the multiple light emission modules 110 are arranged at intervals along the first direction and the second direction, the light beam adjustment module 130 is configured to perform angle deflection and/or light spot expansion on all or some of emission laser beam groups 1112 of corresponding multiple light emission modules 110 that are output by the emission lens module 120 along the first direction and the second direction, to reduce an interval between angles of view of two adjacent emission laser beam groups 1112 along the first direction and reduce an interval between angles of view of two adjacent emission laser beam groups 1112 along the second direction, so that intervals are all less than or equal to a preset value.

In some embodiments, along a corresponding direction, the light beam adjustment module 130 performs angle deflection and/or light spot expansion on all emission laser beams 1111 output by the emission lens module 120, so that the interval between the angles of view of every two adjacent emission laser beams 1111 in all the emission laser beams 1111 output by the laser beam emission module 100 is less than or equal to the preset value. In this case, all emission laser beams 1111 output by the laser beam emission module 100 are emission laser beams 1111 output after being processed by the light beam adjustment module 130. Along a corresponding direction, the light beam adjustment module 130 performs angle deflection and/or light spot expansion on some emission laser beams 1111 output by the emission lens module 120, so that the interval between the angles of view of every two adjacent emission laser beams 1111 in all the emission laser beams 1111 output by the laser beam emission module 100 is less than or equal to the preset value. In this case, all emission laser beams 1111 output by the laser beam emission module 100 include emission laser beams 1111 output after being processed by the light beam adjustment module 130, and emission laser beams 1111 directly output by the emission lens module 120 without being processed by the light beam adjustment module 130. That is, an emission laser beam group directly output by the emission lens module 120 without being processed by the light beam adjustment module 130 is a fixed laser beam group.

In some exemplary embodiments, when the light beam adjustment module 130 performs angle deflection on all the emission laser beams 1111 output by the emission lens module 120, all the emission laser beam groups 1112 of all corresponding light emission modules 110 that are processed by the light beam adjustment module 130 are deflected towards an adjacent emission laser beam group 1112, to reduce an interval between angles of view of two adjacent emission laser beam groups 1112, so that the interval is less than or equal to the preset value. When the light beam adjustment module 130 performs angle deflection on some emission laser beams 1111 output by the emission lens module 120, some emission laser beam groups 1112 of some corresponding light emission modules 110 that are processed by the light beam adjustment module 130 are deflected towards a fixed emission laser beam group, to reduce an interval between angles of view of two adjacent emission laser beam groups 1112, so that the interval is less than or equal to the preset value.

Further, in some embodiments, when the multiple light emission modules 110 are arranged at intervals along the first direction (or the second direction), and the light beam adjustment module 130 is configured to perform angle deflection on all or some of emission laser beam groups 1112 output by the emission lens module 120 along the first direction x (or the second direction); and the light beam adjustment module 130 includes a refractive optical structure 131, the refractive optical structure 131 is located on a light outgoing side of the emission lens module 120 and configured to receive all or some of the emission laser beam groups 1112 output by the emission lens module 120 and refract a light beam, so that the received emission laser beam group 1112 is deflected along the first direction x (or the second direction) towards an adjacent emission laser beam group 1112 after being refracted by the refractive optical structure 131. The light beam adjustment module 130 performs angle deflection on all or some of emission laser beam groups 1112 output by the emission lens module 120, so that distribution of light spots of all or some of the emission laser beam groups 1112 in the entire emission angle of view can be changed and the interval between the angles of view of every two adjacent emission laser beam groups 1112 in the entire emission angle of view is less than or equal to the preset value.

In some embodiments, the light beam adjustment module 130 is configured to perform angle deflection on all emission laser beam groups 1112 output by the emission lens module 120 along the first direction x (or the second direction) and the number of refraction portions 1311 included in the refractive optical structure 131 is equal to the number of light emission modules 110. Assuming that the number of light emission modules 110 is M, M light emission modules 110 are arranged at intervals along the first direction (or second direction) x, where M is a positive integer, and M≥2. The refractive optical structure 131 includes M refraction portions 1311 arranged along the first direction x (or the second direction), and the M refraction portions 1311 are on the light outgoing side of the emission lens module 120, and are in a one-to-one correspondence with M emission laser beam groups 1112 emitted by the M light emission modules 110, where an $m^{th}$ refraction portion 1311 is configured to receive an emission laser beam group 1112 obtained after an emission laser beam group 1112 emitted by an $m^{th}$ light emission module 110 is processed by the emission lens module 120, so that the received emission laser beam group 1112 is subject to angle deflection after being refracted, to deflect along the first direction x (or the second direction) towards an adjacent emission laser beam group 1112. where m is a positive integer, and 1≤m≤M. In this case, referring to FIG. 2, FIG. 3, and FIG. 4, the refractive optical structure 131 uses the M refraction portions of refractive optical structure 131 to perform angle deflection on M emission laser beam groups 1112 output by the emission lens module 120 along the first direction x (or the second direction), all the emission laser beam groups 1112 subject to angle deflection are deflected towards an adjacent emission laser beam group 1112, to reduce an interval between angles of view of two adjacent emission laser beam groups 1112, so that the interval is less than or equal to the preset value. In addition, multiple emission laser beam groups 1112 are simultaneously deflected towards each other (angle deflection directions of the multiple emission laser beam groups 1112 are not completely different), which can reduce a required deflection angle of each emission laser beam group 1112 and reduce a refraction requirement for each refraction portion 1311.

In some embodiments, the light beam adjustment module 130 is configured to perform angle deflection on some emission laser beam groups 1112 output by the emission lens module 120 along the first direction x (or the second direction) and the number of refraction portions 1311 included in the refractive optical structure 131 is one less than the number of light emission modules 110. Assuming that the number of light emission modules 110 is M, M light emission modules 110 are arranged at intervals along the first direction x, where M is a positive integer, and ≥2. The refractive optical structure 131 includes M−1 refraction portions 1311 arranged along the first direction x (or the second direction), and the M−1 refraction portions 1311 are on the light outgoing side of the emission lens module 120, are in a one-to-one correspondence with emission laser beam groups 1112 emitted by M−1 light emission modules 110, and are configured to receive emission laser beam groups 1112 obtained after the emission laser beam groups 1112 emitted by M−1 light emission modules 110 are processed by the emission lens module 120, so that the received emission laser beam groups 1112 are subject to angle deflection after being refracted, to deflect along the first direction x (or the second direction) towards a fixed emission laser beam group 1112, where the fixed emission laser beam group 1112 is an emission laser beam group 1112 output after an emission laser beam group 1112 emitted by one light emission module 110 unequipped with the refraction portion 1311 correspondingly in the M light emission modules 110 are processed by the emission lens module 120. In this case, referring to FIG. 5 and FIG. 6, when the M−1 refraction portions 1311 perform angle deflection on M−1 emission laser beam groups 1112 output by the emission lens module 120 along the first direction x (or the second direction), all the emission laser beam groups 1112 subject to angle deflection are deflected towards a fixed emission laser beam group 1112, to reduce an interval between angles of view of two adjacent emission laser beam groups 1112, so that the interval is less than or equal to the preset value. In addition, compared with a manner in which the M refraction portions 1311 perform angle deflection on the M emission laser beam groups 1112 respectively to ensure that the M emission laser beam groups are deflected towards each other and deflection directions of the M emission laser beam groups are not the same, in some embodiments, M−1 refraction portions 1311 control M−1 emission laser beam groups 1112 to deflect towards a direction of the fixed emission laser beam group 1112, to reduce an interval between angles of view of two adjacent emission laser beam groups 1112 and reduce the number of refraction portions 1311 in the refractive optical structure 131 while ensuring that the interval is less than or equal to the preset value, thereby reducing manufacturing costs.

In some embodiments, the refraction portion 1311 in the refractive optical structure 131 may be a prism; and multiple refraction portions 1311 may be integrally formed or independently disposed.

Figure 2:
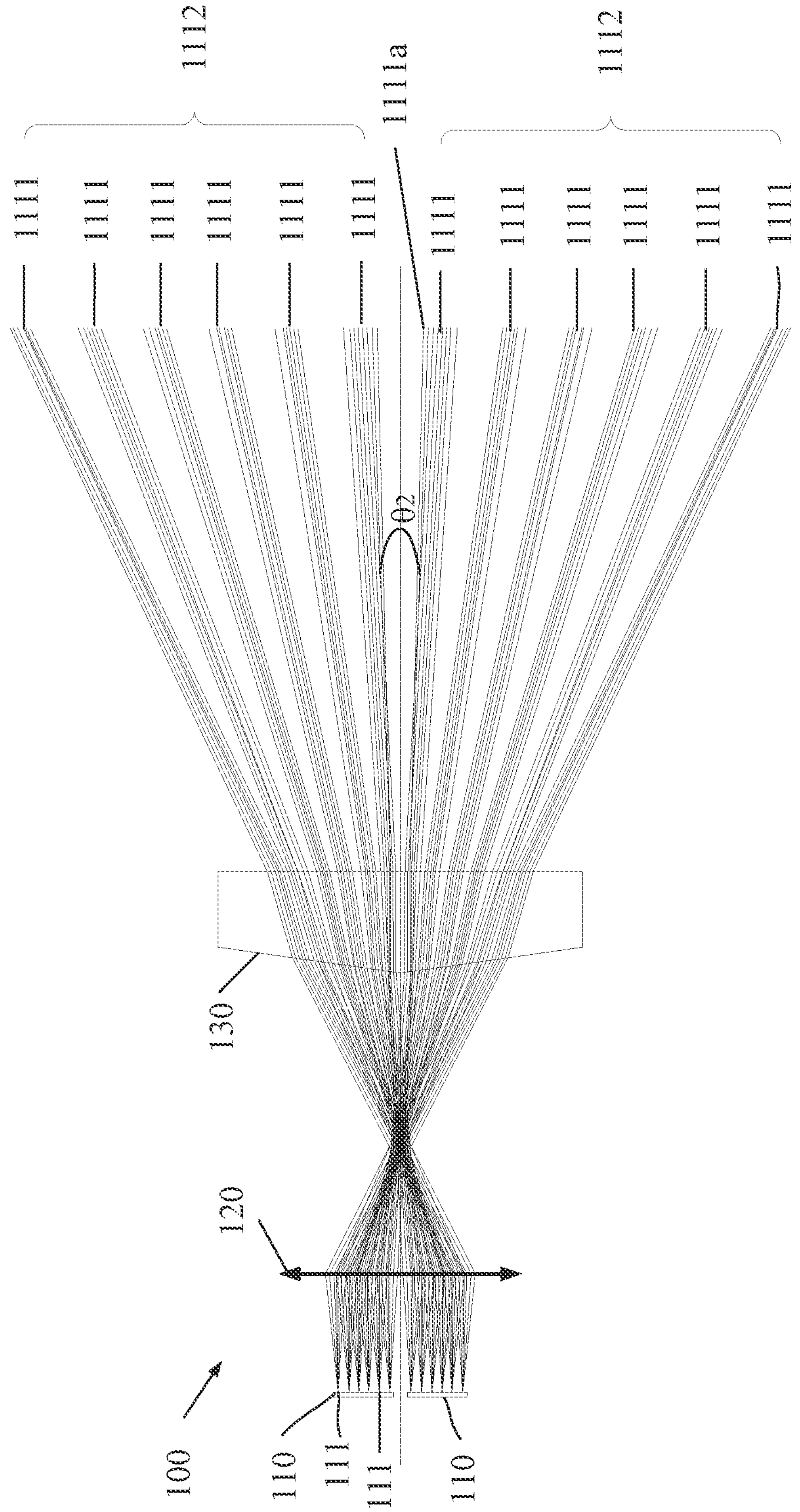
FIG. 2 is a first schematic structural diagram of a laser beam emission module according to an embodiment of this application.
Figure 3:
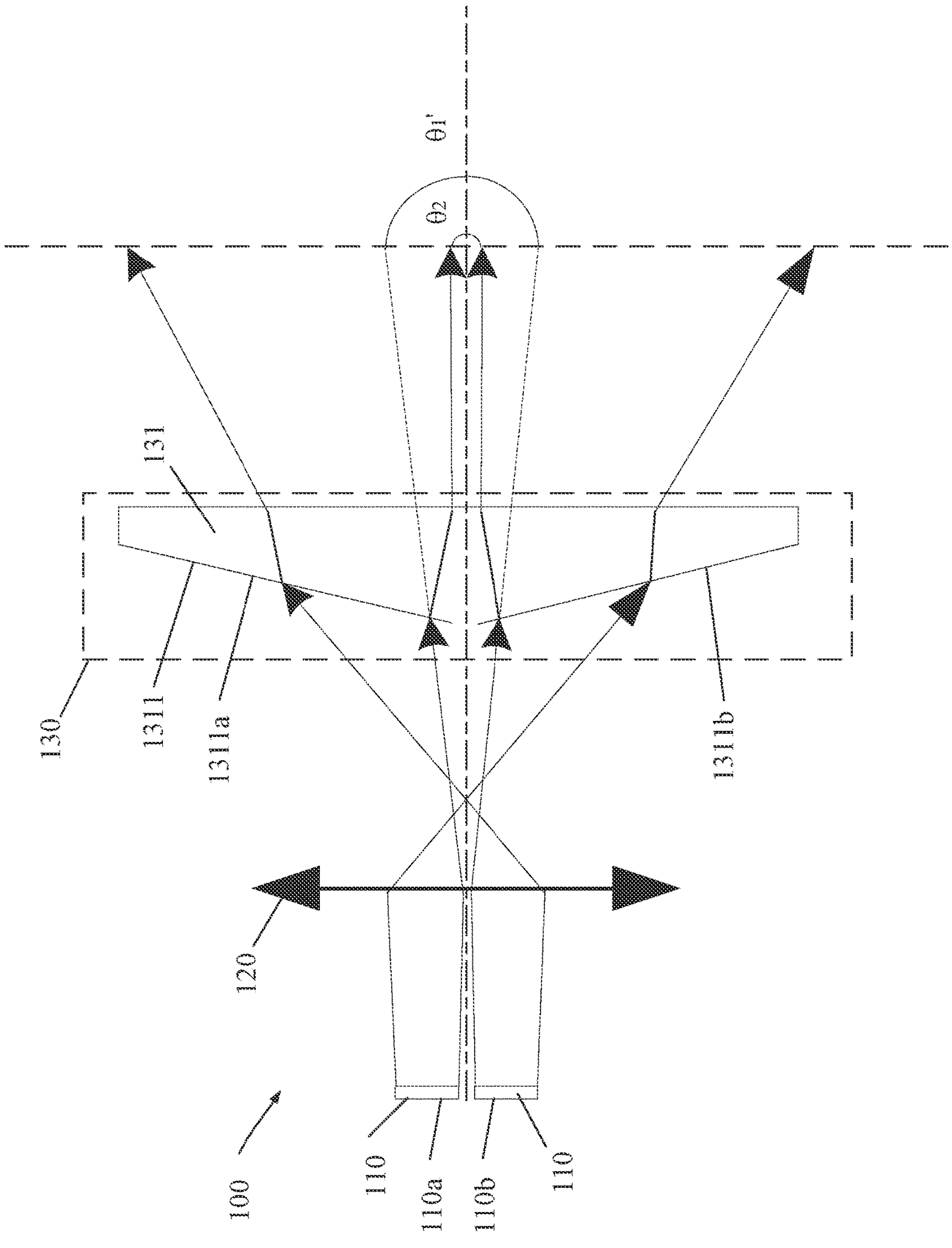
FIG. 3 is a second schematic structural diagram of a laser beam emission module according to an embodiment of this application.
Figure 4:
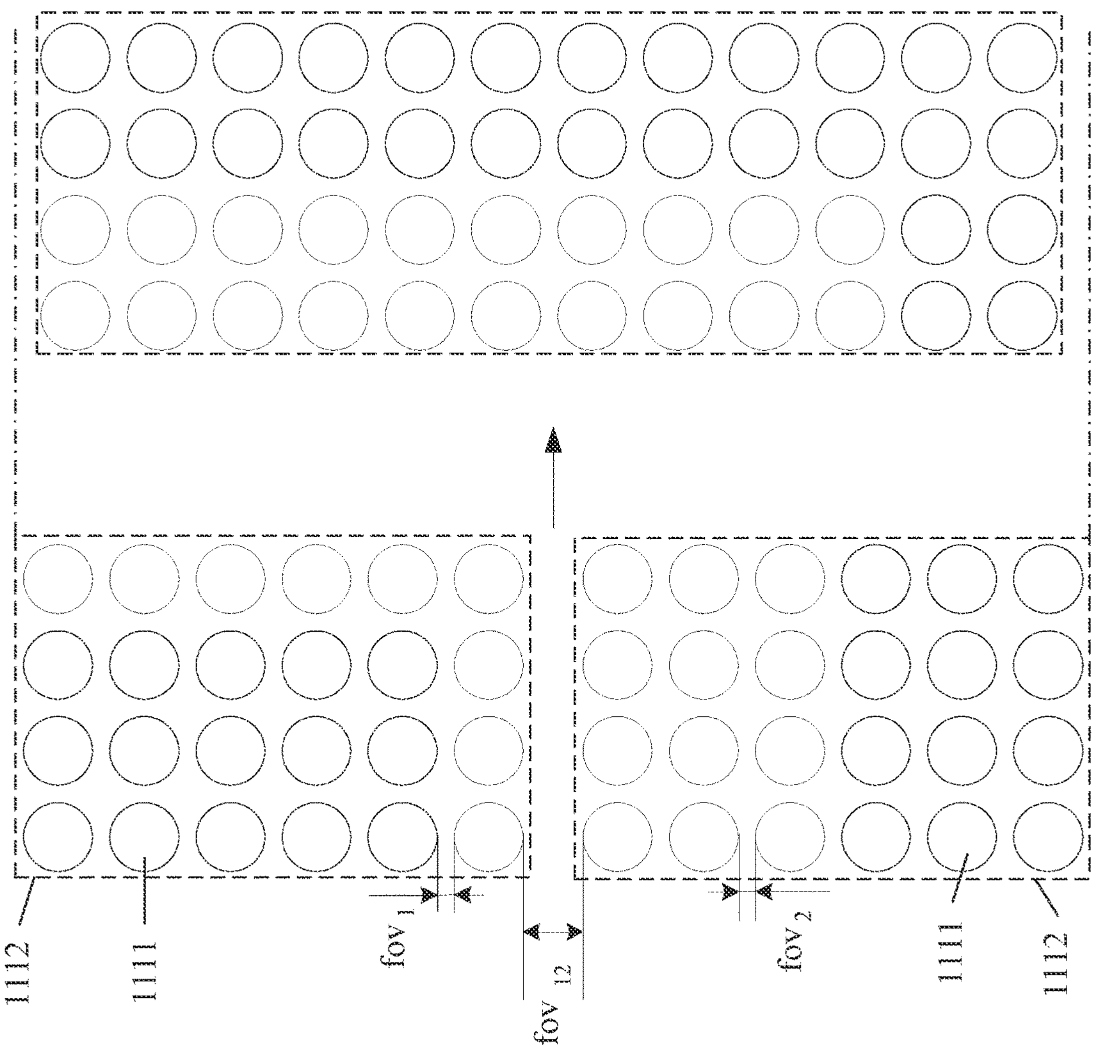
FIG. 4 is a schematic diagram of a first light spot distribution change before and after a light beam adjustment module adjusts the laser beam emission module according to an embodiment of this application.

For example, as shown in FIG. 2, FIG. 3, and FIG. 4, when M=2, the two light emission modules 110 included in the laser beam emission module 100 can be respectively referred to as a light emission module 110*a* and a light emission module 110*b*. In this case, the refractive optical structure 131 can include a refraction portion 1311*a* and a refraction portion 1311*b*, and the refraction portion 1311*a* and the refraction portion 1311*b* can perform angle deflection on the two emission laser beam groups 1112 output by the light emission module 110*a* and the light emission module 110*b* towards a central field-of-view region.

Figure 5:
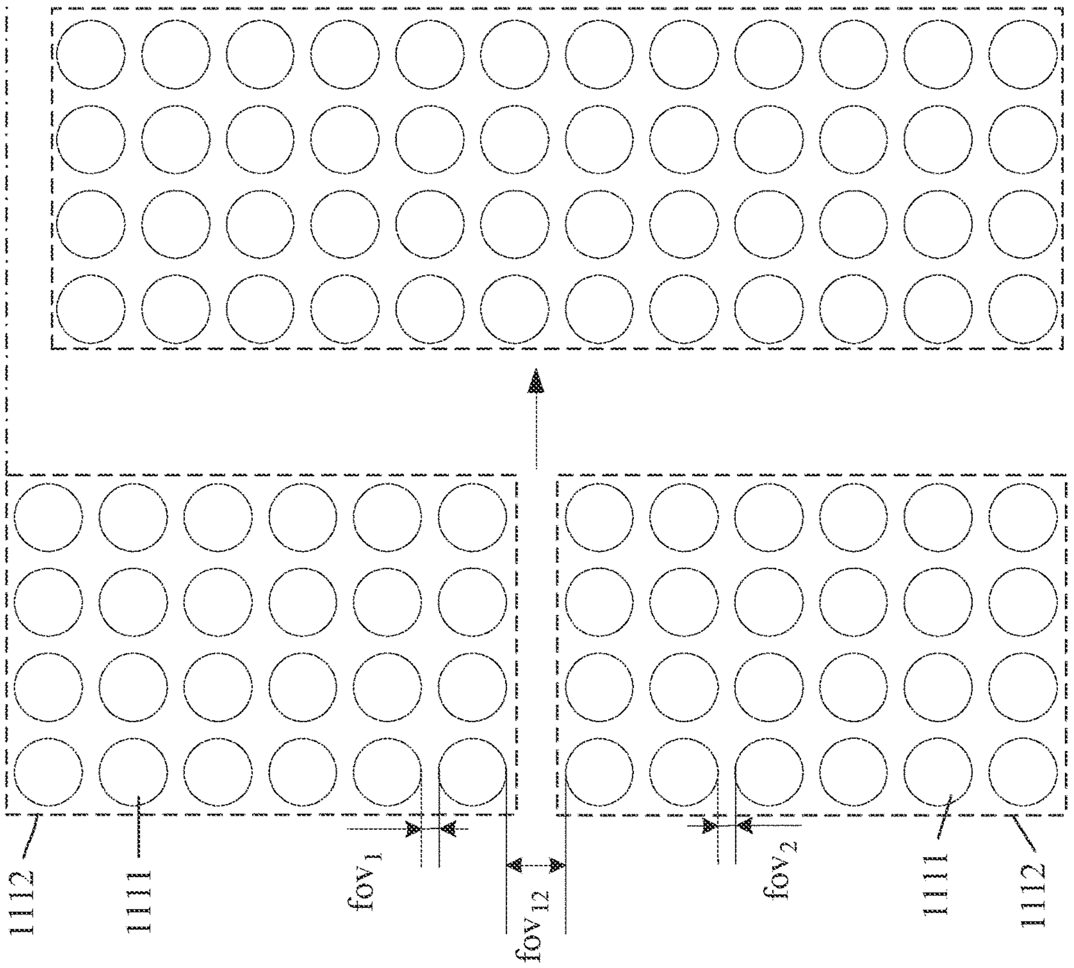
FIG. 5 is a schematic diagram of a second light spot distribution change before and after a light beam adjustment module adjusts the laser beam emission module according to an embodiment of this application.
Figure 6:
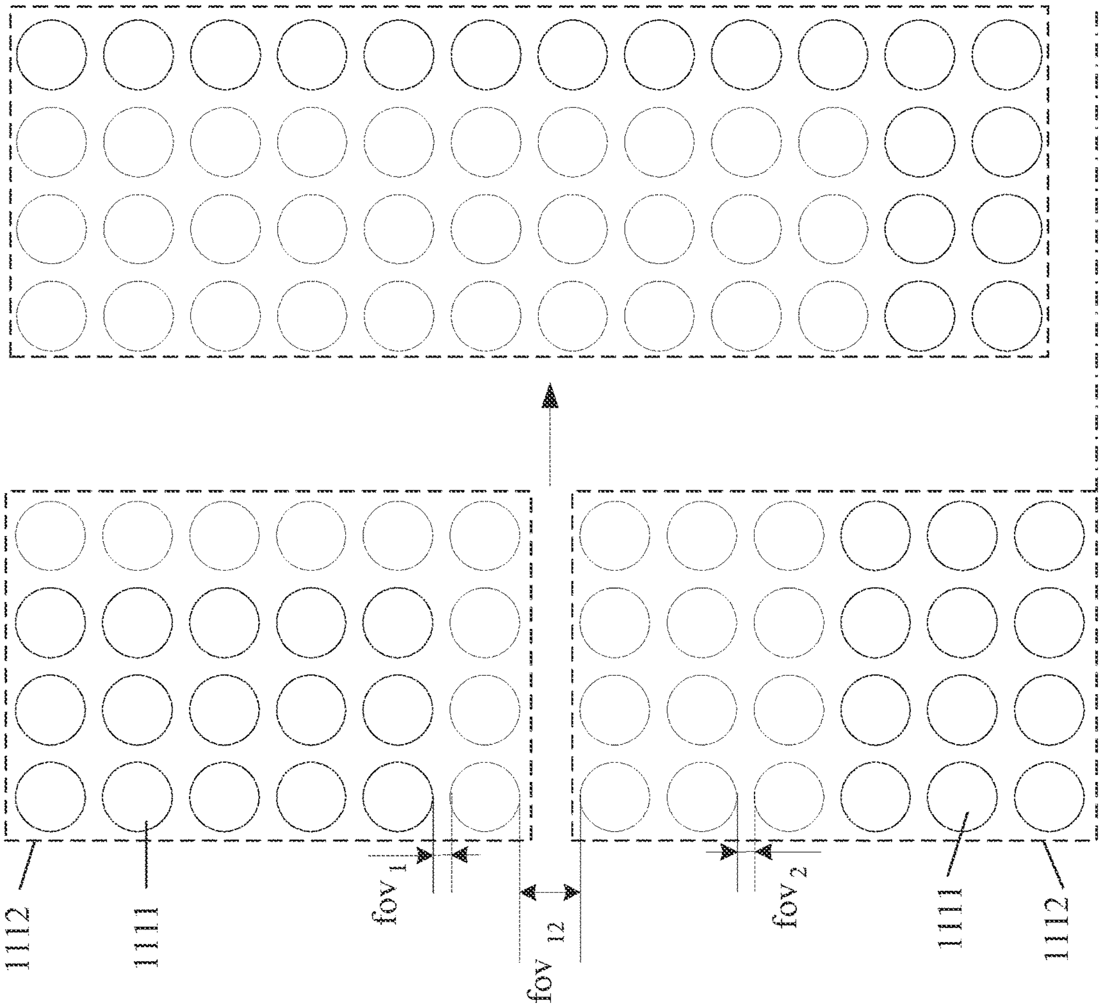
FIG. 6 is a schematic diagram of a third light spot distribution change before and after a light beam adjustment module adjusts the laser beam emission module according to an embodiment of this application.

In some embodiments, the refractive optical structure 131 may only include a refraction portion 1311*a*, so that an emission laser beam group 1112 output by the light emission module 110*a*, rotates towards an emission laser beam group 1112 output by the light emission module 110*b* (as shown in FIG. 5); or the refractive optical structure 131 may only include a refraction portion 1311*b*, so that an emission laser beam group 1112 output by the light emission module 110*b* rotates towards an emission laser beam group 1112 output by the light emission module 110*a* (as shown in FIG. 6). For example, when M>2, and the laser beam emission module 100 includes more than three light emission modules 110, in one solution, the refractive optical structure 131 may include M refraction portions 1311, that is, all emission laser beam groups 1112 emitted by M light emission modules 110 are subject to angle deflection. In this case, a reference field-of-view region can be disposed, for example, a central field-of-view region, and all emission laser beams 1111 can be deflected along the first direction x and/or the second direction y towards the reference field-of-view region, to reduce the distance between two adjacent emission laser beam groups 1112. In some embodiments, the refractive optical structure 131 may include M−1 refraction portions 1311, that is, only emission laser beam groups 1112 emitted by M−1 light emission modules 110 are subject to angle deflection. In this case, the field-of-view region to which an emission laser beam group 1112 that needs no angle deflection is directed is the reference field-of-view region, and other M−1 emission laser beam groups 1112 are all deflected along the first direction x and/or the second direction y towards the reference field-of-view region to which the emission laser beam group 1112 that needs no angle deflection is directed.

Figure 7:
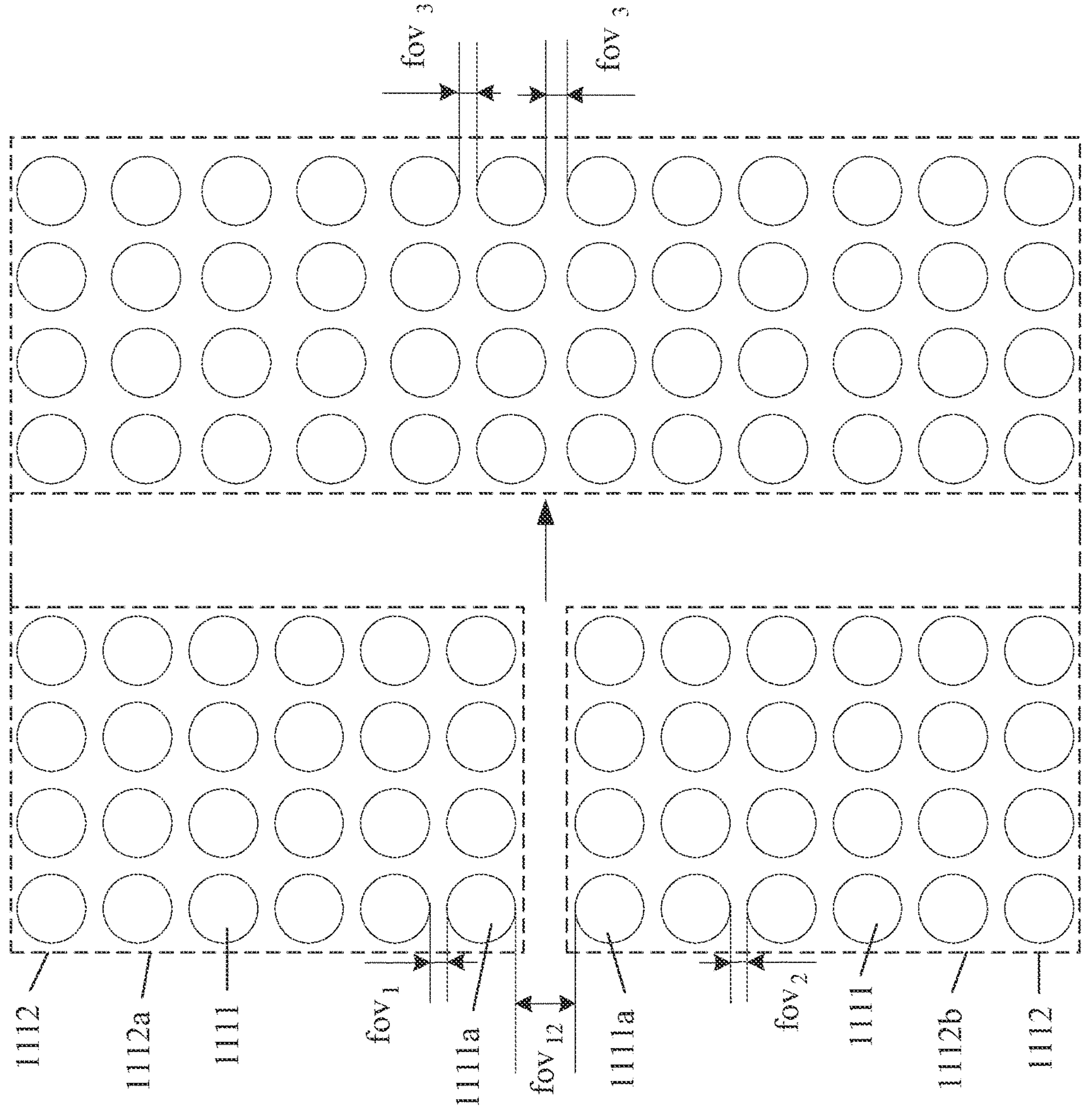
FIG. 7 is a schematic diagram of a fourth light spot distribution change before and after a light beam adjustment module adjusts the laser beam emission module according to an embodiment of this application.

When the refractive optical structure 131 deflects the emission laser beam group 1112, referring to FIG. 2 to FIG. 6, the refractive optical structure 131 can deflect all emission laser beams 1111 in the same emission laser beam group 1112. Referring to FIG. 7, the refractive optical structure 131 can also deflect some emission laser beams 1111 in the same emission laser beam group 1112. Referring to FIG. 7, when some emission laser beams 1111 in the emission laser beam group 1112 are deflected, the emission laser beams 1111 can be edge emission laser beams 1111*a* that are in all the emission laser beams 1111 of the emission laser beam group 1112 and that are close to another adjacent emission laser beam group 1112. In this case, in order to distinguish between the edge emission laser beam 1111*a* and another emission laser beam 1111 in the same emission laser beam group 1112, the edge emission laser beam is numbered 1111*a*. In some embodiments, the edge emission laser beam 1111*a* can be deflected towards another adjacent emission laser beam group 1112, so that a blind spot in the fields of view between the emission laser beam group 1112 and another adjacent emission laser beam group 1112 can be reduced.

In some embodiments, when the refractive optical structure 131 deflects the emission laser beam 1111 in the emission laser beam group 1112, referring to FIG. 4 to FIG. 6, deflection degrees of the deflected emission laser beams 1111 in the emission laser beam group 1112 may be the same. Referring to FIG. 7, deflection degrees of the deflected emission laser beams 1111 in the emission laser beam group 1112 may not be the same.

In some embodiments, when the deflection degrees of the deflected emission laser beams 1111 are not the same, referring to FIG. 7, for the two adjacent emission laser beam groups 1112, the entire emission angle of view formed by two adjacent emission laser beam groups 1112 remains unchanged before and after the two adjacent emission laser beam groups 1112 pass through the refractive optical structure 131, and in all emission laser beams 1111 in the two adjacent emission laser beam groups 1112 processed by the refractive optical structure 131, an interval between angles of view of every two adjacent emission laser beams 1111 is equal to the same value within a preset range. For example, for the adjacent first emission laser beam group 1112*a* and second emission laser beam group 1112*b*, when ranges of the emission angles of view of the adjacent first emission laser beam group 1112*a* and second emission laser beam group 1112*b* before and after the adjacent first emission laser beam group 1112*a* and second emission laser beam group 1112*b* pass through the refractive optical structure 131 remain unchanged, and intervals between angles of view of every two adjacent emission laser beams 111 after the adjacent first emission laser beam group 1112*a* and second emission laser beam group 1112*b* pass through the refractive optical structure 131 are the same value fov3 within the preset range, the laser beam emission module 100 satisfies the following conditional formula 1: $[n1*s+(n1-1)*fov1]+fov12+[n2*s+(n2-1)*fov2]=(n1+n2)*s+[(n1-n2)-1]*fov3$; and after the preceding conditional formula 1 is properly processed, the following conditional formula 2 may be obtained: $fov3=[(n1-1)*fov1+fov12+(n2-1)*fov2]/[(n1+n2)-1]$, where fov1 is the interval between the angles of view of two adjacent emission laser beams 1111 in the first emission laser beam group 1112*a* that does not pass through the refractive optical structure 131, fov2 is the interval between the angles of view of two adjacent emission laser beams 1111 in the second emission laser beam group 1112*b* that does not pass through the refractive optical structure 131, fov12 is the interval between the angles of view of the first emission laser beam group 1112*a* and the second emission laser beam group 1112*b* that do not pass through the refractive optical structure 131, n1 and s are respectively the number of light emission units 111 in the light emission module 110 that emits the first emission laser beam group 1112*a*, and a light emission area corresponding to each light emission unit, and n2 and s are respectively the number of light emission units 111 in the light emission module 110 that emits the second emission laser beam group 1112*b*, and a light emission area corresponding to each light emission unit. Referring to a conditional formula 3: $H=f*\tan\theta$, where f is focal length of the emission lens module, conditional formulas 4 can be obtained: $fov1=\arctan(D1/f)$, $fov2=\arctan(D2/f)$, and $fov12=\arctan(Dv/f)$, where D1 is an interval between two adjacent light emission units 111 in the light emission module 110 that emits the first emission laser beam group 1112*a*, D2 is the interval between two adjacent light emission units 111 in the light emission module 110 that emits the second emission laser beam group 1112*b*, and Dv is an interval between the light emission module 110 that emits the first emission laser beam group 1112*a* and the light emission module 110 that emits the second emission laser beam group 1112*b*. The conditional formula 4 is substituted into the conditional formula 2, the interval between angles of view of two adjacent emission laser beams 1111 can be calculated to be equal to fov3, and by designing a slope factor of a refraction surface of each refraction portion 1311 in the refractive optical structure 131, the interval between the angles of view of emission laser beams 1111 in the two adjacent emission laser beam groups 1112 can be adjusted. In some embodiments, D1=D2, fov1=fov2, and the two refraction portions 1311 corresponding to the two emission laser beam groups 1112 can have the same structure and be symmetrically disposed (as shown in FIG. 2 and FIG. 3).

In an example, a distance Dv between two light emission modules 110 satisfies Dv=0.12 mm, distances between light emission units in the light emission module 110 satisfy D1=D2=1003 mm, and focal length of the emission lens module 120 satisfy f=5 mm. After passing through the emission lens module 120, a laser beam of each light emission module 110 that is closest to a central field-of-view region has an angle of view of 0.6875°, an interval between the fields of view of the light emission modules 110 is 1.375°, and an interval between angles of view of two adjacent light emission units in each light emission module 110 is equal to 0.34°. A wedge-shaped prism (the refraction portion uses a prism, and two adjacent refraction portions are integrated into the wedge-shaped prism) is added behind a position that is on the light outgoing side of the emission lens module 120 and at which separation of the two laser beam groups starts. Herein, a front surface of the prism is tilted by 1° and a rear surface is tilted by 0°, and therefore, an emission angle of view is deflected by 0.16° after a laser beam of each light emission module 110 that is closest to the central field-of-view region passes through the wedge-shaped prism. After a laser beam (direction: 1.0275°=0.6875°+0.34°) adjacent to the laser beam closest to the central field-of-view region passes through the wedge-shaped prism, an emission angle of view is deflected by 0.5°, an interval between angles of view of two adjacent laser beam groups is adjusted to 0.32°, an interval between angles of view of two adjacent laser beams in each laser beam group is still 0.34° (0.5 to 0.16), thereby basically uniformizing intervals between the emission angles in the entire field of view.

Figure 8:
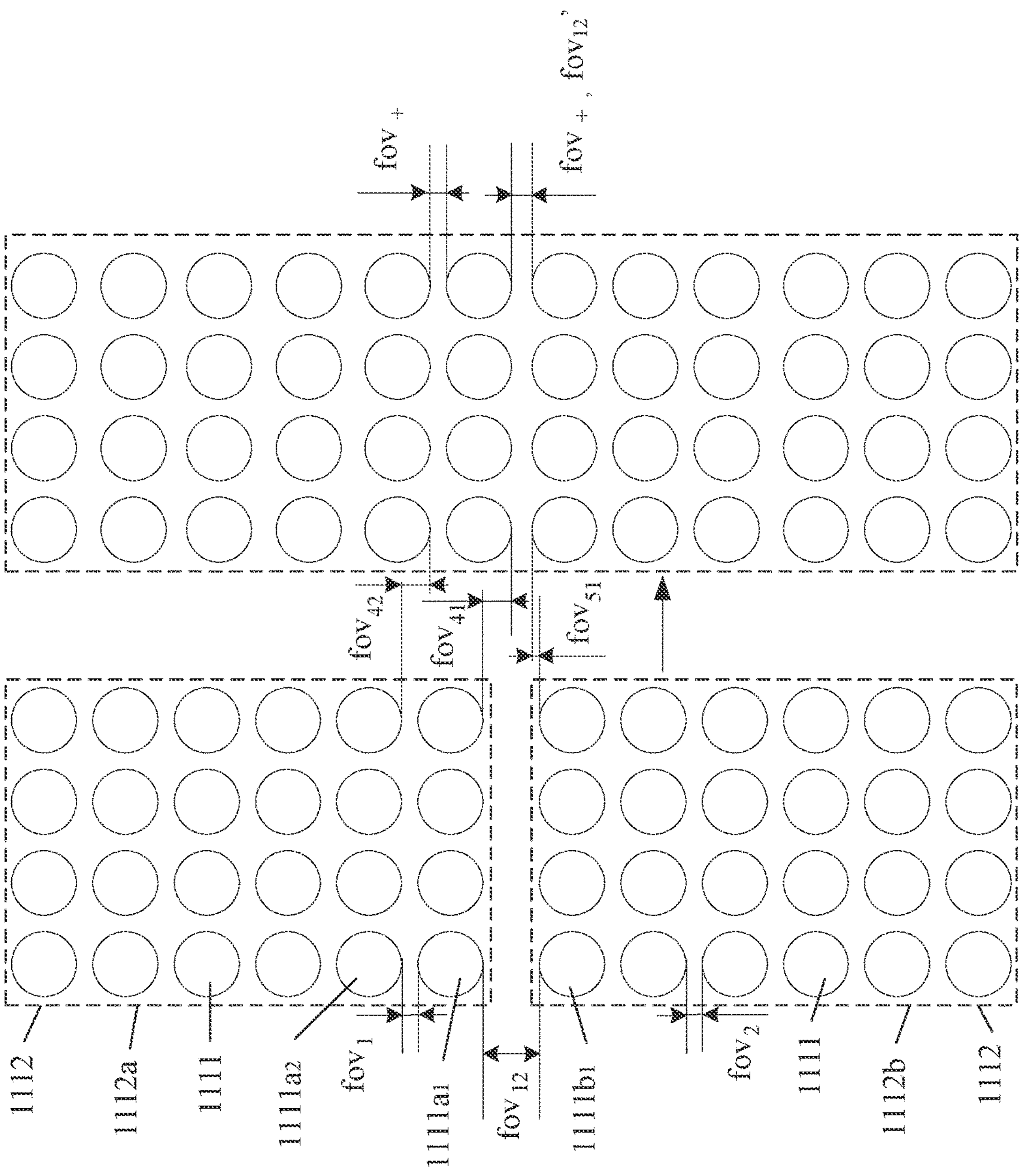
FIG. 8 is a schematic diagram of a fifth light spot distribution change before and after a light beam adjustment module adjusts the laser beam emission module according to an embodiment of this application.
Figure 9:
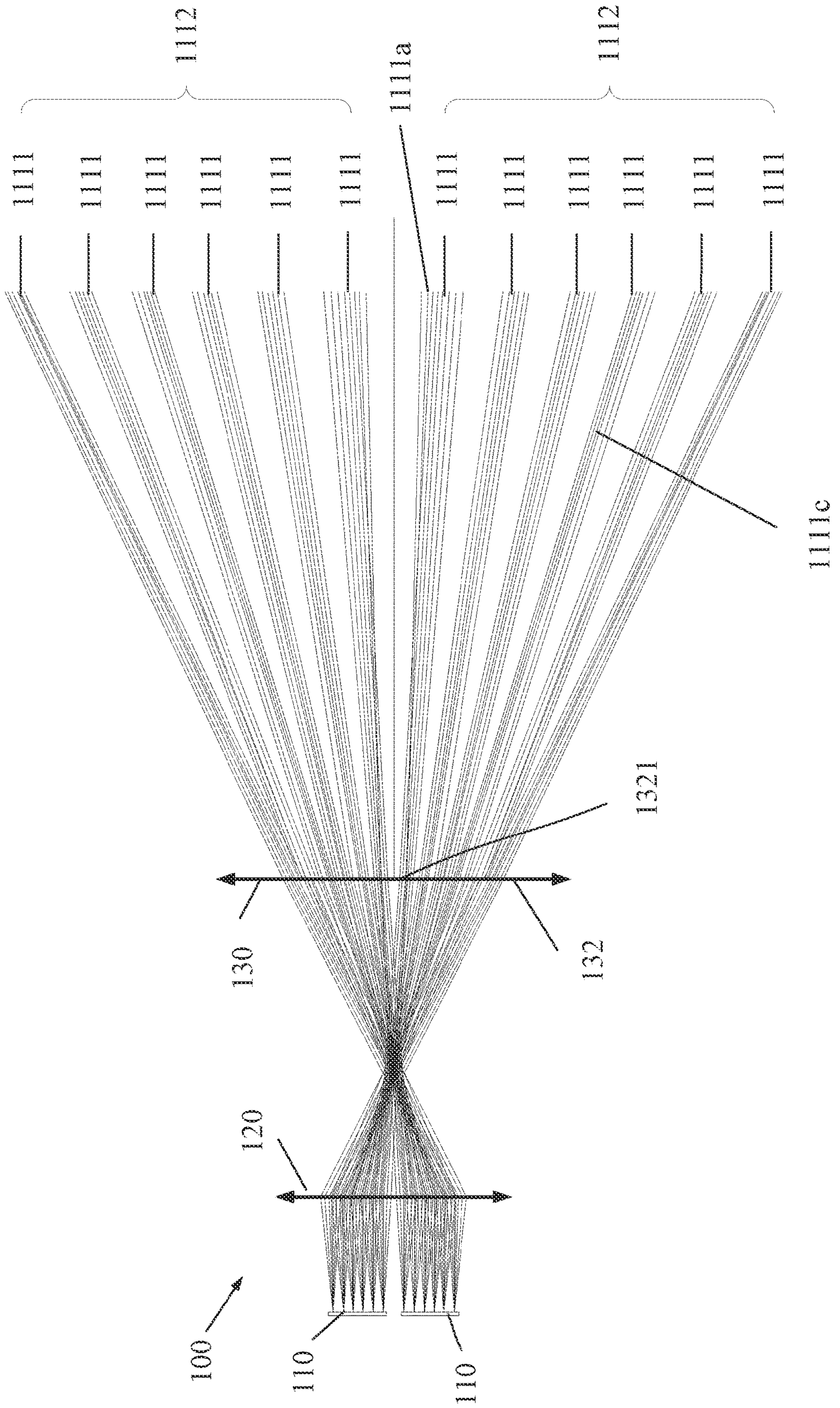
FIG. 9 is a third schematic structural diagram of a laser beam emission module according to an embodiment of this application.
Figure 10:
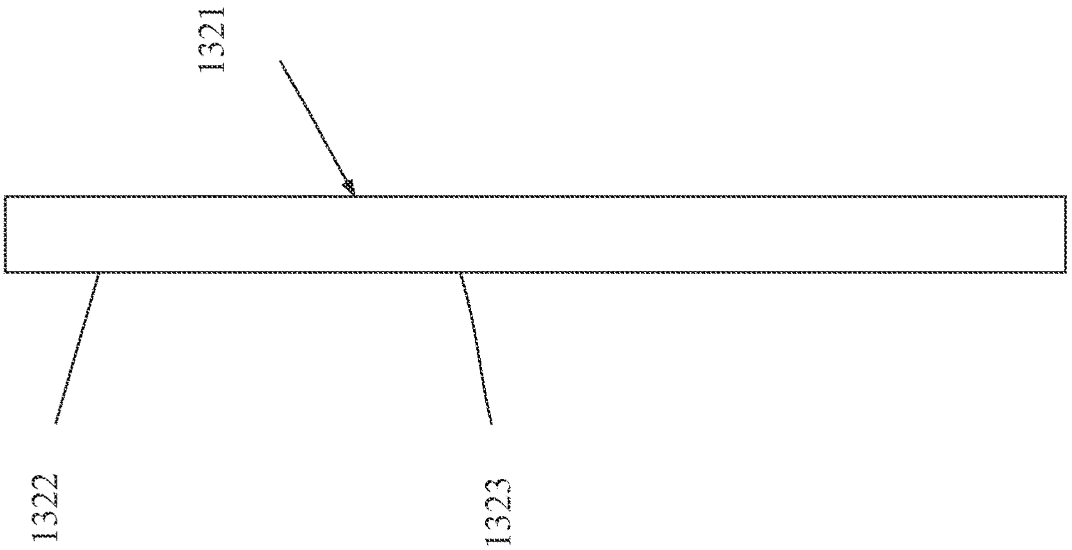
FIG. 10 is a schematic structural diagram of a light uniformizing portion in a laser beam emission module according to an embodiment of this application.
Figure 11:
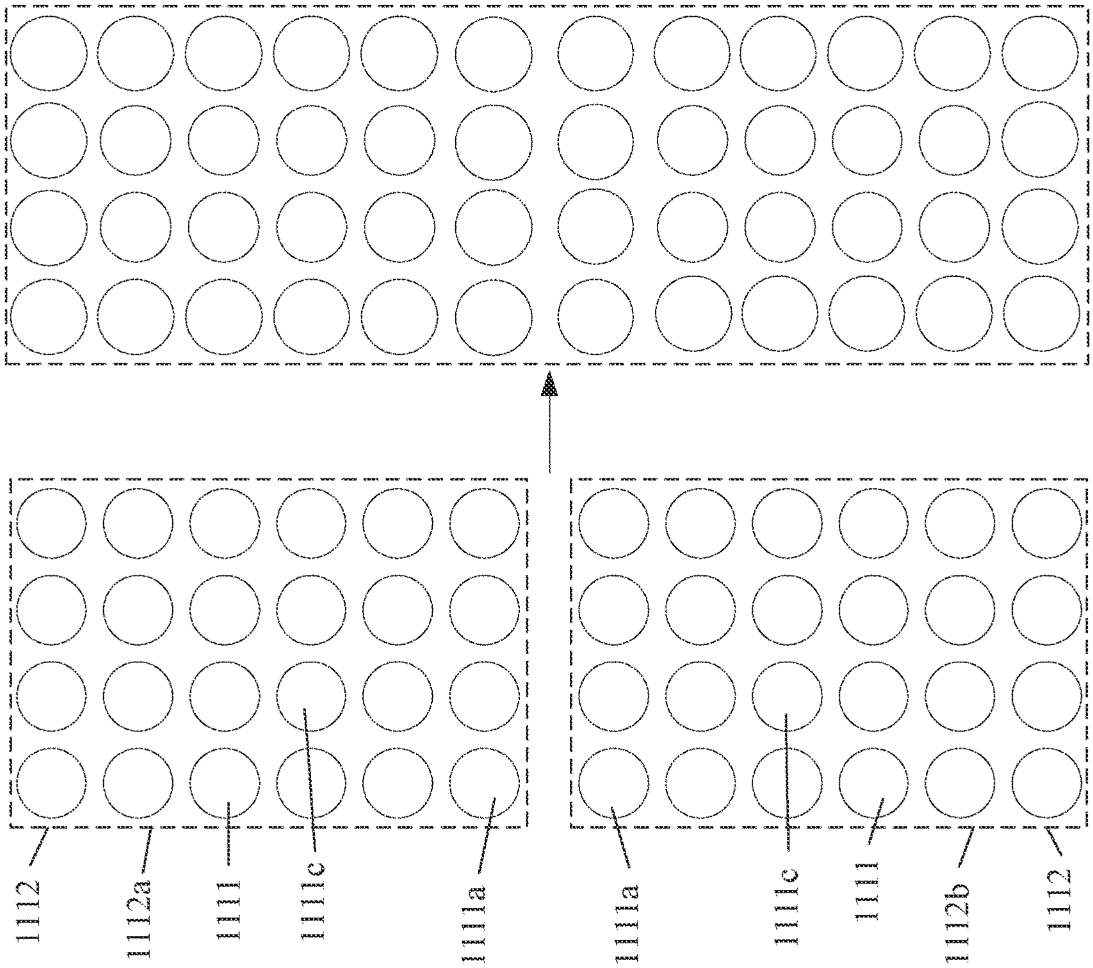
FIG. 11 is a schematic diagram of a sixth light spot distribution change before and after a light beam adjustment module adjusts the laser beam emission module according to an embodiment of this application.

In some embodiments, when the deflection degrees of the deflected emission laser beams 1111 are not the same, referring to FIG. 8, based on a detection requirement, the interval between the angles of view of every two adjacent emission laser beams 1111 after every two adjacent emission laser beams 1111 pass through the refractive optical structure 131 can be preset to a preset value that meets a detection requirement. For example, for the adjacent first emission laser beam group 1112*a* and second emission laser beam group 1112*b*, when intervals between angles of view of every two adjacent emission laser beams 111 after the first emission laser beam group 1112*a* and the second emission laser beam group 1112*b* pass through the refractive optical structure 131 are both a preset value fov+ in a preset range, in order that an interval between angles of view of the first emission laser beam group 1112*a* and the second emission laser beam group 1112*b* is fov+, an edge emission laser beam 1111*a*1 closer to the second emission laser beam group 1112*b* in the first emission laser beam group 1112*a* can be deflected by fov41 towards the second emission laser beam group 1112*b*, an edge emission laser beam 1111*b*1 closer to the first emission laser beam group 1112*a* in the second emission laser beam group 1112*b* is deflected by fov51 towards the first emission laser beam group 1112*a*, and in this case, a central interval fov12' between a deflected first emission laser beam group 1112*a* and second emission laser beam group 1112*b* satisfy $fov12'=fov12-fov41-fov51=fov+$. Similarly, in the first emission laser beam group 1112*a*, in order that an interval between angles of view of an edge emission laser beam 1111*a*1 closer to the second emission laser beam group 1112*b* and a secondary edge emission laser beam 1111*a*2 closer to the second emission laser beam group 1112*b* in the first emission laser beam group 1112*a* is fov+, the secondary edge emission laser beams 1111*a*2 in the first emission laser beam group 1112*a* can be deflected by fov42 towards the second emission laser beam group 1112*b*, where $fov42=((fov12/2)+fov1)-((fov12/2)-fov41)-fov+=fov1+fov41-fov+$. By analogy, based on a set interval fov+ between angles of view, the refractive optical structure 131 deflects every emission laser beam 1111, so that the interval between the angles of view of every two adjacent emission laser beams 1111 can be equal to the preset interval fov+ between angles of view. In some embodiments, when the multiple light emission modules 110 are arranged at intervals along the first direction (or the second direction), and the light beam adjustment module 130 is configured to perform light spot expansion on all or some of emission laser beam groups 1112 output by the emission lens module 120 along the first direction x (or the second direction), referring to FIG. 9, the light beam adjustment module 130 includes a light uniformizing structure 132, and the light uniformizing structure 132 is located on a light outgoing side of the emission lens module 120 and configured to uniformize all or some of the emission laser beam groups 1112 output by the emission lens module 120 along the first direction x (or the second direction), to enlarge a light spot size of the emission laser beams 1111 and reduce an interval between angles of view of two adjacent emission laser beam groups 1112.

In some embodiments, the light uniformizing structure 132 may include a light uniformizing portion 1321, and the number p of light uniformizing portions 1321 included in the light uniformizing structure 132 and the number M of light emission modules 110 may satisfy $M/2 \le p \le M$, where M is an even number, or satisfy $(M-1)/2 \le p \le M$, where M is an odd number.

In some embodiments, the light uniformizing structure 132 includes p light uniformizing portions 1321 arranged along the first direction x (or the second direction), the p light uniformizing portions 1321 are on the light outgoing side of the emission lens module 120, and one light uniformizing portion 1321 is correspondingly provided for at least one of the emission laser beam groups 1112 emitted by every two adjacent light emission modules 110, and is configured to receive an emission laser beam group 1112 obtained after an emission laser beam group 1112 emitted by a corresponding light emission module 110 is processed by the emission lens module 120, so that the received emission laser beam group 1112 is subject to light uniformization along the first direction x.

In some embodiments, the light uniformizing portion 1321 may include a first portion 1322 and a second portion 1323. The first portion 1322 is arranged around the periphery of the second portion 1323, the first portion 1322 corresponds to an edge emission laser beam 1111*a* at an edge of a received emission laser beam group 1112, the second portion 1323 corresponds to an intermediate emission laser beam 1111*c* in the middle of a received emission laser beam group 1112, and a light uniformizing degree of the first portion 1322 is higher than that of the second portion 1323, so that a light uniformizing effect on the edge emission laser beam 1111*a* is better than that on the intermediate emission laser beam 1111*c* and a light spot size of the edge emission laser beam 1111*a* after the edge emission laser beam 1111*a* passes through the light uniformizing portion 1321 is larger than that of the intermediate emission laser beam 1111*c* after the intermediate emission laser beam 1111*c* passes through the light uniformizing portion 1321, thereby reducing the interval between angles of view of two adjacent emission laser beam groups 1112 after the two adjacent emission laser beam groups 1112 pass through the light uniformizing portion 1321 and improving a detection effect.

The light uniformizing structure 132 can be spaced apart from the emission lens module 120, in this case, the light uniformizing structure 132 can be a diffuser or the like. The light uniformizing structure 132 can also be integrated with the emission lens module 120. In some embodiments, the laser beam emission module 100 may only include the light uniformizing structure 132 spaced apart from the emission lens module 120, or may only include the light uniformizing structure 132 integrated with the emission lens module 120 (for example, a light outgoing surface of the last lens of the emission lens module 120 is coated with a light uniformizing material), or can not only include the light uniformizing structure 132 spaced apart from the emission lens module 120, but also include the light uniformizing structure 132 integrated with the emission lens module 120.

In some embodiments, the multiple light emission modules 110 in the laser beam emission module 100 may be arranged at intervals along the first direction x and the second direction y, at this time, the light beam adjustment module 130 may be configured to perform angle deflection and/or light spot expansion on all or some of emission laser beam groups 1112 output by the emission lens module 120 along the first direction x and the second direction y, to reduce an interval between angles of view of two adjacent emission laser beam groups 1112, so that intervals are all less than or equal to a preset value.

In some embodiments, when the light beam adjustment module 130 is configured to perform angle deflection on all or some of emission laser beam groups 1112 output by the emission lens module 120 along the first direction x and the second direction y, the light beam adjustment module 130 includes a first refractive optical structure and a second refractive optical structure, and the first refractive optical structure is located on a light outgoing side of the emission lens module 120 and configured to refract a light beam, so that all or some of the emission laser beam groups 1112 output by the emission lens module 120 is deflected along the first direction x towards an adjacent emission laser beam group 1112 after being refracted by the first refractive optical structure. The second refractive optical structure, located on a light outgoing side of the emission lens module 120 and configured to refract a light beam, so that all or some of the emission laser beam groups 1112 output by the emission lens module 120 are deflected along the second direction v towards an adjacent emission laser beam group 1112 after being refracted by the second refractive optical structure. The first refractive optical structure cooperates with the second refractive optical structure, so that all or some of the emission laser beam groups 1112 output by the emission lens module 120 are deflected along the first direction x and the second direction y towards an adjacent emission laser beam group 1112.

In some embodiments, if the number of light emission modules 110 is M*N (M rows and N columns), M is a positive integer, $M \ge 2$, N is a positive integer, and $N \ge 2$, the first refractive optical structure may include M first refraction portions arranged along the first direction x, or may also include $M-1$ first refraction portions arranged along the first direction x; and the second refractive optical structure may include N second refraction portions arranged along the second direction y or $N-1$ second refraction portions arranged along the second direction y.

In some embodiments, the first refractive optical structure includes M first refraction portions arranged along the first direction x, and the M first refraction portions are on the light outgoing side of the emission lens module 120, and are in a one-to-one correspondence with emission laser beam groups 1112 emitted by the M rows of light emission modules 110, where an $m^{th}$ first refraction portion is configured to receive an emission laser beam group 1112 obtained after an emission laser beam group 1112 emitted by an $m^{th}$ row of light emission modules 110 is processed by the emission lens module 120, so that the received emission laser beam group 1112 is subject to angle deflection after being refracted, to deflect along the first direction x towards an adjacent emission laser beam group 1112, where m is a positive integer, and $1 \le m \le M$. In this case, the first refractive optical structure uses the M first refraction portions 1311 to perform angle deflection on M rows of emission laser beam groups 1112 output by the emission lens module 120 along the first direction x, all the emission laser beam groups 1112 subject to angle deflection are deflected towards an adjacent row of emission laser beam groups 1112, to reduce an interval between angles of view of two adjacent rows of emission laser beam groups 1112, so that the interval is less than or equal to the preset value. In addition, multiple rows of emission laser beam groups 1112 are simultaneously deflected towards each other (angle deflection directions of the multiple rows of emission laser beam groups 1112 are not completely different), which can reduce a required deflection angle of each row of emission laser beam groups 1112 and reduce a refraction requirement for each first refraction portion 131.

In some embodiments, the first refractive optical structure includes M−1 first refraction portions arranged along the first direction x. The M−1 first refraction portions are on the light outgoing side of the emission lens module 120, are in a one-to-one correspondence with emission laser beam groups 1112 emitted by M−1 rows of light emission modules 110, and are configured to receive emission laser beam groups 1112 obtained after the emission laser beam groups 1112 emitted by M−1 rows of light emission modules 110 are processed by the emission lens module 120, so that the received emission laser beam groups 1112 are subject to angle deflection after being refracted, to deflect along the first direction x towards fixed emission laser beam groups 1112, where the fixed emission laser beam groups 1112 are emission laser beam groups 1112 output after emission laser beam groups 1112 emitted by one row of light emission modules 110 unequipped with the first refraction portion correspondingly in the M rows of light emission modules 110 are processed by the emission lens module 120. In some embodiments, M−1 refraction portions 1311 control M−1 rows of emission laser beam groups 1112 to deflect towards a direction of the fixed row of emission laser beam groups 1112, to reduce an interval between angles of view of two adjacent rows of emission laser beam groups 1112 and reduce the number of refraction portions 1311 in the refractive optical structure 131 while ensuring that the interval is less than or equal to the preset value, thereby reducing manufacturing costs.

In some embodiments, the second refractive optical structure includes N second refraction portions arranged along the second direction y, and the N second refraction portions are on the light outgoing side of the emission lens module 120, and are in a one-to-one correspondence with emission laser beam groups 1112 emitted by N columns of light emission modules 110, where an $n^{th}$ second refraction portion is configured to receive an emission laser beam group 1112 obtained after an emission laser beam group 1112 emitted by an n th column of light emission modules 110 is processed by the emission lens module 120, so that the received emission laser beam group 1112 is subject to angle deflection after being refracted, to deflect along the second direction y towards an adjacent emission laser beam group 1112, where n is a positive integer, and $1 \le n \le N$. In this case, the second refractive optical structure uses the N second refraction portions to perform angle deflection on N columns of emission laser beam groups 1112 output by the emission lens module 120 along the second direction y, all the emission laser beam groups 1112 subject to angle deflection are deflected towards an adjacent column of emission laser beam groups 1112, to reduce an interval between angles of view of two adjacent columns of emission laser beam groups 1112, so that the interval is less than or equal to the preset value. In addition, multiple columns of emission laser beam groups 1112 are simultaneously deflected towards each other (angle deflection directions of the multiple columns of emission laser beam groups 1112 are not completely different), which can reduce a required deflection angle of each column of emission laser beam groups 1112 and reduce a refraction requirement for each first refraction portion 1311.

In some embodiments, the second refractive optical structure includes N−1 second refraction portions arranged along the second direction y, and the N−1 second refraction portions are on the light outgoing side of the emission lens module 120, are in a one-to-one correspondence with emission laser beam groups 1112 emitted by N−1 columns of light emission modules 110, and are configured to receive emission laser beam groups 1112 obtained after the emission laser beam groups 1112 emitted by N−1 columns of light emission modules 110 are processed by the emission lens module 120, so that the received emission laser beam groups 1112 are subject to angle deflection after being refracted, to deflect along the second direction y towards fixed emission laser beam groups 1112, where the fixed emission laser beam groups 1112 are emission laser beam groups 1112 output after emission laser beam groups 1112 emitted by one column of light emission modules 110 unequipped with the second refraction portion correspondingly in the N columns of light emission modules 110 are processed by the emission lens module 120. In some embodiments, N−1 refraction portions 1311 control N−1 columns of emission laser beam groups 1112 to deflect towards a direction of the fixed column of emission laser beam groups 1112, to reduce an interval between angles of view of two adjacent columns of emission laser beam groups 1112 and reduce the number of refraction portions 1311 in the refractive optical structure 131 while ensuring that the interval is less than or equal to the preset value, thereby reducing manufacturing costs.

In some embodiments, when a row interval between two adjacent rows of light emission modules 110 is equal to a column interval between two adjacent columns of light emission modules 110, the second refraction portion can have the same structure as the first refraction portion 1311. During assembling, a function of the second refraction portion can be implemented by rotating the first refraction portion 1311 by 90 degrees. When M=N, that is, the number of rows of the light emission modules 110 in the laser beam emission module 100 is equal to the number of columns of the light emission modules 110, the second refractive optical structure can be the same as the first refracting optical structure. During assembling, a function of the second refraction portion can be implemented by rotating the first refractive structure by 90 degrees. When the first refractive optical structure and/or the second refractive optical structure deflects the emission laser beam group 1112, the first refractive optical structure and; or the second refractive optical structure can deflect all emission laser beams 1111 in the same emission laser beam group 1112, or the first refractive optical structure and/or the second refractive optical structure can also deflect some emission laser beams 1111 in the same emission laser beam group 1112.

When some emission laser beams 1111 in the same emission laser beam group 1112 are deflected along the first direction x, the emission laser beams 1111 can be edge emission laser beams that are in all the emission laser beams 1111 of the emission laser beam group 1112 and that are close to another adjacent emission laser beam group 1112 along the first direction x. The edge emission laser beam can be deflected towards another adjacent emission laser beam group 1112, so that a blind spot in the fields of view that is formed in the first direction x between the emission laser beam group 1112 and another adjacent emission laser beam group 1112 along the first direction x can be reduced. When some emission laser beams 1111 in the same emission laser beam group 1112 are deflected along the second direction y, the emission laser beams 1111 can be edge emission laser beams that are in all the emission laser beams 1111 of the emission laser beam group 1112 and that are close to another adjacent emission laser beam group 1112 along the second direction y. The edge emission laser beam can be deflected towards another adjacent emission laser beam group 1112, so that a blind spot in the fields of view that is formed in the second direction y between the emission laser beam group 1112 and another adjacent emission laser beam group 1112 along the second direction y can be reduced.

When the first refractive optical structure deflects emission laser beams 1111 in the same emission laser beam group 1112 along the first direction x, deflection degrees of the deflected emission laser beams 1111 in the same emission laser beam group 1112 along the first direction x may be the same, or deflection degrees of the deflected emission laser beams 1111 in the same emission laser beam group 1112 along the first direction x may not be the same. When the second refractive optical structure deflects emission laser beams 1111 in the same emission laser beam group 1112 along the second direction y, deflection degrees of the deflected emission laser beams 1111 in the same emission laser beam group 1112 along the second direction y may be completely the same, or deflection degrees of the deflected emission laser beams 1111 in the same emission laser beam group 1112 along the second direction y may not be completely the same.

For example, when the deflection degrees of the deflected emission laser beams 1111 in the same emission laser beam group 1112 along the first direction x may not be the same, a principle of maintaining the emission angles of view formed by two adjacent emission laser beam groups 1112 in the first light emission module 110*a* along the first direction x unchanged before and after the two adjacent emission laser beam groups 1112 pass through the first refractive optical structure and a principle of ensuring that an interval between angles of view of every two adjacent emission laser beams 1111 along the first direction x that are processed by the first refractive optical structure is equal to the same value within the preset range may be used to design the deflection degrees of the emission laser beams 1111 along the first direction x. At this time, a value of fov3 can be calculated directly by using the foregoing conditional formula 2. At this time, D1 in the foregoing conditional formula 2 is an interval between two adjacent light emission units 111 along the first direction x in the light emission module 110 that emits the first emission laser beam group 1112*a* in the first emission module 110*a*, D2 is the interval between two adjacent light emission units 111 along the first direction x in the light emission module 110 that emits the second emission laser beam group 1112*b* in the first emission module 110*a*, and Dv is an interval between the light emission module 110 that emits the first emission laser beam group 1112*a* and the light emission module 110 that emits the second emission laser beam group 1112*b*. In some embodiments, when the deflection degrees of the emission laser beams 1111 deflected in the same emission laser beam group 1112 along the first direction x are not the same, based on a detection requirement, the interval between the angles of view of every two adjacent emission laser beams 1111 along the first direction x can be preset to fov+. When the deflection degrees of the emission laser beams 1111 deflected in the same emission laser beam group 1112 along the second direction y are not completely the same, the foregoing two methods can also be used for design, and only the first direction x needs to be changed to the second direction y.

The first refractive optical structure may be spaced apart from the second refractive optical structure. In some embodiments, the first refractive optical structure and the second refractive optical structure may be spaced apart along a transmission direction of an optical path. For example, the first refractive optical structure may be located on a light incident side of the second refractive optical structure, or the second refractive optical structure may be located on a light incident side of the first refractive optical structure. In some embodiments, when the first refractive optical structure and the second refractive optical structure relate to multiple stages of refraction, structures in the first refractive optical structure and the second refractive optical structure may be disposed alternately.

When the second refractive optical structure is located on the light outgoing side of the first refractive optical structure, the light beam adjustment module 130 first reduces the interval between angles of view of two adjacent rows of emission laser beam gr Nips in the multiple rows of emission laser beam groups along the first direction, and then reduces the interval between angles of view of two adjacent columns of emission laser beam groups in the multiple columns of emission laser beam groups along the second direction, so that the interval between two emission laser beam groups corresponding to every two adjacent light emission modules in the multiple light emission modules 110 arranged at intervals along the first direction and the second direction is reduced to be less than or equal to a preset value. When the first refractive optical structure is located on the light outgoing side of the second refractive optical structure, the light beam adjustment module 130 first reduces the interval between angles of view of two adjacent columns of emission laser beam groups in the multiple columns of emission laser beam groups along the second direction, and then reduces the interval between angles of view of two adjacent rows of emission laser beam groups in the multiple rows of emission laser beam groups along the first direction, so that the interval between two emission laser beam groups corresponding to every two adjacent light emission modules in the multiple light emission modules 110 arranged at intervals along the second direction and the first direction is reduced to be less than or equal to a preset value.

In some embodiments, when the light beam adjustment module 130 is configured to perform light spot expansion on all or some of emission laser beam groups 1112 output by the emission lens module 120 along the first direction x and the second direction y, the light beam adjustment module 130 includes a light uniformizing structure 132, the light uniformizing structure 132 may be a diffuser, and the diffuser is located on a light outgoing side of the emission lens module 120 and configured to uniformize all or some of the emission laser beam groups 1112 output by the emission lens module 120 along the first direction x and the second direction y, to enlarge a light spot size of the emission laser beams 1111 along the first direction x and the second direction y and reduce an interval between angles of view of two adjacent emission laser beam groups 1112. In some embodiments, the light beam adjustment module 130 includes a first light uniformizing structure and a second light uniformizing structure, and the first light uniformizing structure is located on a light outgoing side of the emission lens module 120 and configured to uniformize all or some of the emission laser beam groups 1112 output by the emission lens module 120 along the first direction x, to enlarge a light spot size of the emission laser beams 1111 along the first direction x; and the second light uniformizing structure is located on a light outgoing side of the emission lens module

120 and configured to uniformize all or some of the emission laser beam groups 1112 output by the emission lens module 120 along the second direction y, to enlarge a light spot size of the emission laser beams 1111 along the second direction y.

In some embodiments, if the number of light emission modules 110 is M*N, M is a positive integer, M≥2, N is a positive integer, and N≥2, the first light uniformizing structure may include p first light uniformizing portions arranged along the first direction x, where p satisfies M/2≤p≤M, where M is an even number, or satisfies (M−1)/2≤p≤M, where M is an odd number. The second light uniformizing structure may include q first light uniformizing portions arranged along the second direction y, where q satisfies N/2≤q≤N, where N is an even number, or satisfies (N−1)/2≤q≤N, where N is an odd number.

In some embodiments, the p first light uniformizing portions are on the light outgoing side of the emission lens module 120, and one first light uniformizing portion is correspondingly provided for at least one of the emission laser beam groups 1112 emitted by every two adjacent rows of light emission modules 110, and is configured to receive an emission laser beam group 1112 obtained after an emission laser beam group 1112 emitted by a corresponding light emission module 110 is processed by the emission lens module 120, so that the received emission laser beam group 1112 is subject to light uniformization along the first direction x. The q second light uniformizing portions are on the light outgoing side of the emission lens module 120, and one second light uniformizing portion is correspondingly provided for at least one of the emission laser beam groups 1112 emitted by every two adjacent columns of light emission modules 110, and is configured to receive an emission laser beam group 1112 obtained after an emission laser beam group 1112 emitted by a corresponding light emission module 110 is processed by the emission lens module 120, so that the received emission laser beam group 1112 is subject to light uniformization along the second direction y.

The first light uniformizing portion may include a first portion and a second portion, the first portion is arranged around the periphery of the second portion, the first portion corresponds to an edge emission laser beam 1111*a* at an edge of a received emission laser beam group 1112, the second portion corresponds to an intermediate emission laser beam 1111*c* in the middle of a received emission laser beam group 1112, and a light uniformizing degree of the first portion is higher than that of the second portion. The second light uniformizing portion may include a third portion and a fourth portion, the third portion is arranged around the periphery of the fourth portion, the third portion corresponds to an edge emission laser beam 1111*a* at an edge of a received emission laser beam group 1112, the fourth portion corresponds to an intermediate emission laser beam 1111*c* in the middle of a received emission laser beam group 1112, and a light uniformizing degree of the third portion is higher than that of the fourth portion.

The first light uniformizing structure can be spaced apart from the second light uniformizing structure, or the first light uniformizing structure and the second light uniformizing structure can be integrated. The first light uniformizing structure can be spaced apart from the emission lens module 120. In this case, the first light uniformizing structure can be a diffuser or the like. The first light uniformizing structure can also be integrated with the emission lens module 120. The second light uniformizing structure can be spaced apart from the emission lens module 120. In this case, the second light uniformizing structure can be a diffuser or the like. The second light uniformizing structure can also be integrated with the emission lens module 120 (for example, a light uniformizing material is applied on a lens of the emission lens module 120).

In some embodiments, the laser beam emission module 100 may only include a light beam adjustment module 130, and the first light uniformizing structure and the second light uniformizing structure in the light beam adjustment module 130 may be spaced apart from the emission lens module 120, and in this case, the first light uniformizing structure and the second light uniformizing structure can be spaced apart or integrated; one of the first light uniformizing structure and the second light uniformizing structure in the light beam adjustment module 130 may be spaced apart from the emission lens module 120, and the other is integrated with the emission lens module 120; or both the first light uniformizing structure and the second light uniformizing structure in the light beam adjustment module 130 may also be integrated with the emission lens module 120.

In some embodiments, the laser beam emission module 100 may include more than two light beam adjustment modules 130, and a first light uniformizing structure and a second light uniformizing structure in one of the more than two light beam adjustment modules 130 may be both integrated with the emission lens module 120; one of the first light uniformizing structure and the second light uniformizing structure in one of the more than two light beam adjustment modules 130 may be integrated with the emission lens module 120, and the other is spaced apart from the emission lens module 120; or the more than two light beam adjustment modules 130 may also be spaced apart from the emission lens module 120.

In some embodiments, the light beam adjustment module 130 reduces an interval between angles of view of two adjacent emission laser beam groups 1112 along the first direction x and an interval between angles of view of two adjacent emission laser beam groups 1112 along the second direction y, so that the interval between the angles of view of every two adjacent emission laser beams 1111 in a horizontal angle of view and a vertical angle of view is less than or equal to the preset value. The first preset value of the interval between the angles of view of every two adjacent emission laser beams 1111 in the first direction x can be equal or unequal to the second preset value of the interval between the angles of view of two adjacent emission laser beams 1111 in the second direction y, which can be flexibly adjusted based on an actual need.

At least one of the refractive optical structure, the first refractive optical structure and the second refractive optical structure may be a prism, the prism is located on a light outgoing side of the emission lens module 120 and configured to receive all or some of the emission laser beam groups 1112 output by the emission lens module 120 and refract a light beam, so that the received emission laser beam group 1112 is deflected along the first direction x and/or the second direction y towards an adjacent emission laser beam group 1112 after being refracted by the prism.

The prism may have a light incident surface, and the refraction portion, the first refraction portion, and the second refraction portion may correspond to deflection regions on the light incident surface; and two adjacent deflection regions may be arranged at an included angle. Referring to FIG. 13 to FIG. 18, after a prism treatment, the interval between the angles of view of the two adjacent emission laser beam groups 1112 changes from a greater value θ1' to a smaller value θ2, which reduces a blind spot of the field of view, thereby improving a detection effect.

The refractive optical structure, the first refractive optical structure, and the second refractive optical structure may also be any other elements capable of deflecting a light beam, for example, a refraction element.

In some embodiments, multiple light emission units 111 on the light emission module 110 may only be arranged along the first direction x. At this time, the emission laser beams 1111 emitted by light emission units 111 on the light emission module 110 are arranged along the first direction x. The multiple light emission units 111 on the light emission module 110 may be arranged along the second direction y. At this time, the emission laser beams 1111 emitted by the light emission units 111 on the light emission module 110 are arranged along the second direction y. The multiple light emission units 111 on the light emission module 110 may be further arranged into an array along both the first direction x and the second direction y. At this time, the emission laser beams 1111 emitted by light emission units 111 on the light emission module 110 are arranged into an array along the first direction x and the second direction y. FIG. 4 to FIG. 8 are schematic diagrams of a change in a light spot formed by emission laser beams 1111 emitted by two adjacent light emission modules 110 via the emission lens module 120, and a change in a light spot formed by emission laser beams 1111 emitted via the refractive optical structure 131 when a laser beam emission module 100 includes multiple light emission modules 110 arranged at intervals along the first direction x and each light emission module 110 has 4×6 light emission units 111 arranged along the first direction x and the second direction y.

Figure 12:
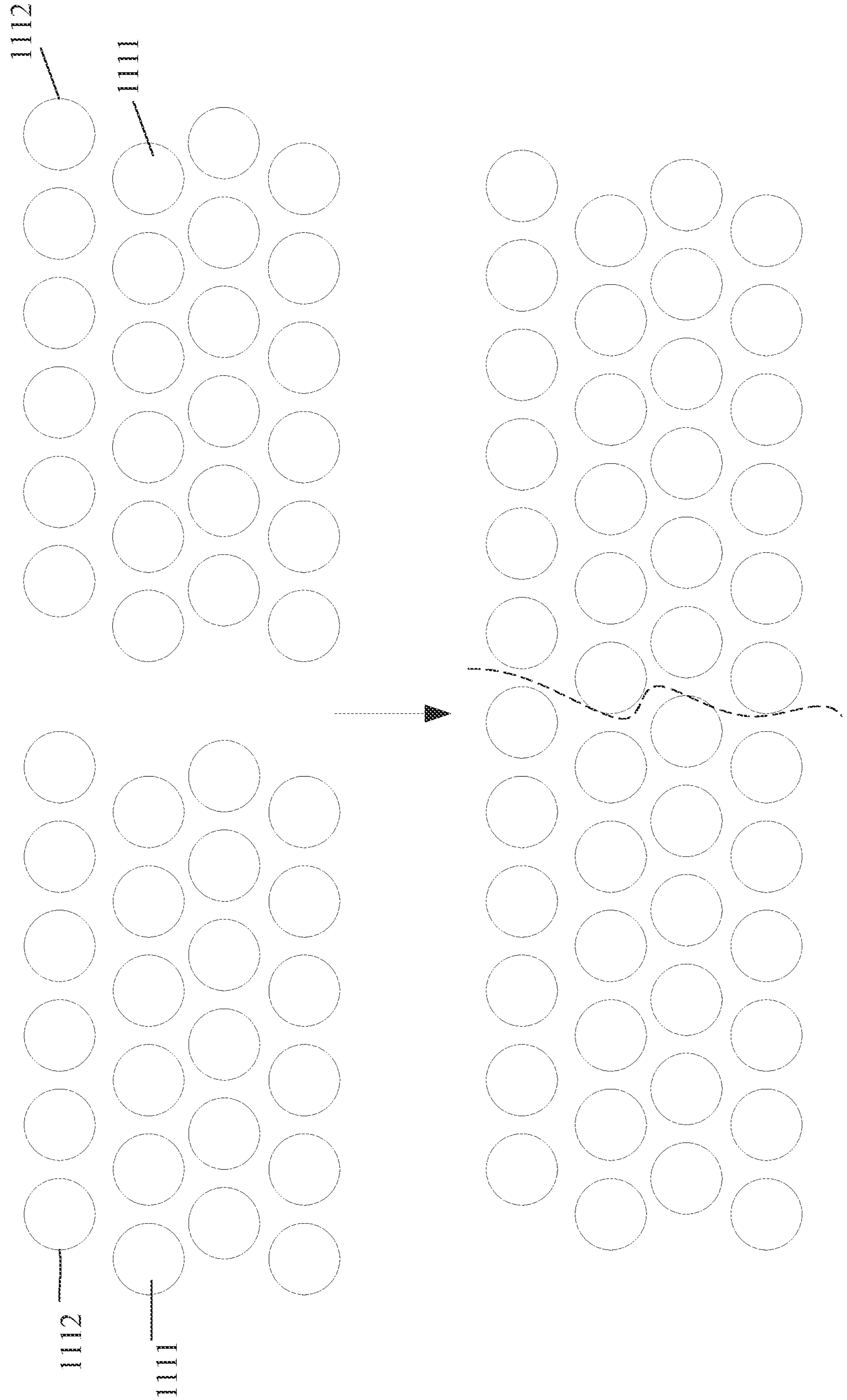
FIG. 12 is a schematic diagram of a seventh light spot distribution change before and after a light beam adjustment module adjusts the laser beam emission module according to an embodiment of this application.

As shown in FIG. 12, in some embodiments, multiple light emission subunits 111 on the light emission module 110 of each laser beam emission module 100 are arranged on an emission plane at equal intervals along a horizontal direction and a vertical direction. In some embodiments, the light emission module 110 of each laser beam emission module 100 includes multiple light emission subunits 111 arranged on the emission plane at equal intervals along the horizontal direction and the vertical direction, and also includes multiple light emission subunits 111 arranged on the emission plane at equal intervals along a diagonal direction. The light emission subunit 111 arranged on the emission plane at equal intervals along a diagonal direction is at a geometric center of a square formed by every four light emission subunits 111 arranged on the emission plane at equal intervals along the horizontal direction and the vertical direction, thereby improving a filling rate of light sources on the emission plane.

Figure 13:
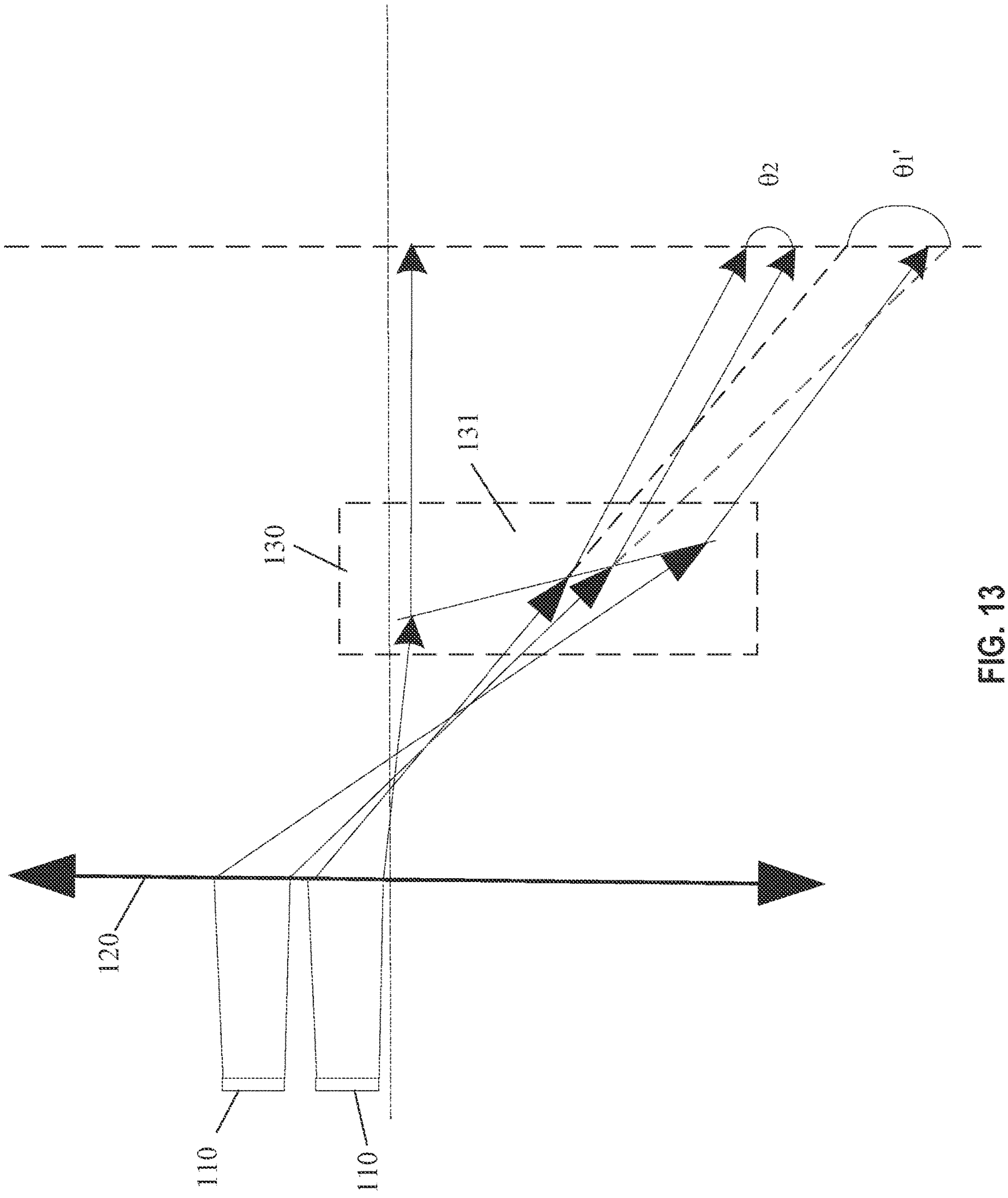
FIG. 13 is a fourth schematic structural diagram of a laser beam emission module according to an embodiment of this application.
Figure 14:
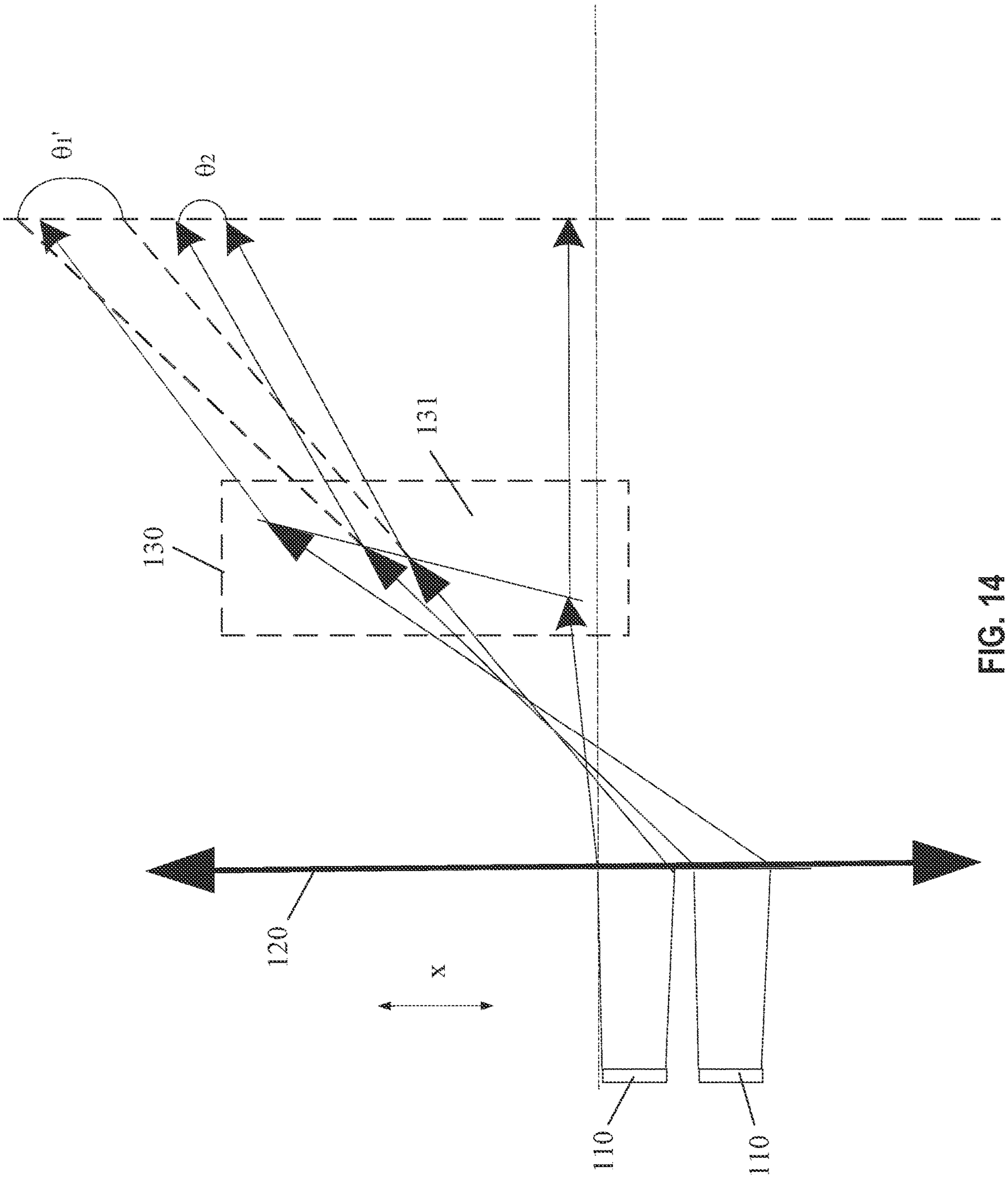
FIG. 14 is a fifth schematic structural diagram of a laser beam emission module according to an embodiment of this application.

In some embodiments, as shown in FIG. 3, FIG. 13, and FIG. 14, the emission lees module 120 includes a first optical axis. Multiple light emission modules 110 are arranged at intervals along the first direction, and the multiple light emission modules 110 are arranged on two opposite sides of the first optical axis (as shown in FIG. 3) or the same side of the first optical axis (as shown in FIG. 13 and FIG. 14) along the first direction x, so that there are multiple emission fields of view for outgoing laser beams of the laser beam emission module, thereby facilitating combination of multiple laser beam emission modules in the LiDAR and satisfying various detection requirements.

In some embodiments, the multiple light emission modules 110 are arranged at intervals along the first direction x and the second direction y, and the multiple light emission modules 110 are located on the same side of the first optical axis along the first direction x, and are located on the same side of the first optical axis along the second direction y; the multiple light emission modules 110 are located on the same side of the first optical axis along the first direction x, and are located on the two opposite sides of the first optical axis along the second direction y; the multiple light emission modules 110 are located on the two opposite sides of the first optical axis along the first direction x, and are located on the same side of the first optical axis along the second direction y; or the multiple light emission modules 110 are located on the two opposite sides of the first optical axis along the first direction x, and are located on the two opposite sides of the first optical axis along the second direction y.

Embodiments of this application further provide a LiDAR 10. The LiDAR 10 includes a laser beam emission module 100, a laser beam receiving module 200, and a signal processing module. The light emission module 110 in the laser beam emission module 100 is configured to emit an emission laser beam 1111 to a target object, the laser beam receiving module 200 receives an echo laser beam reflected by the target object and outputs a corresponding electrical signal, and after the signal processing module processes the electrical signal, distance, azimuth, height, speed, attitude, shape, or other parameters of the target object are obtained, thereby implementing a detection function. The LiDAR 10 may be used for functions such as navigation, obstacle avoidance, obstacle recognition, ranging, speed measurement, and automated driving of products such as automobiles, robots, transport vehicles, and patrol vehicles. This is not limited in embodiments of this application. The laser beam emission module 100 may be the foregoing laser beam emission module 100, so that an interval between angles of view of every two adjacent emission laser beams 1111 in the emission angle of view is less than or equal to a preset value, thereby reducing a blind spot and improving a detection effect of the LiDAR 10.

Figure 15:
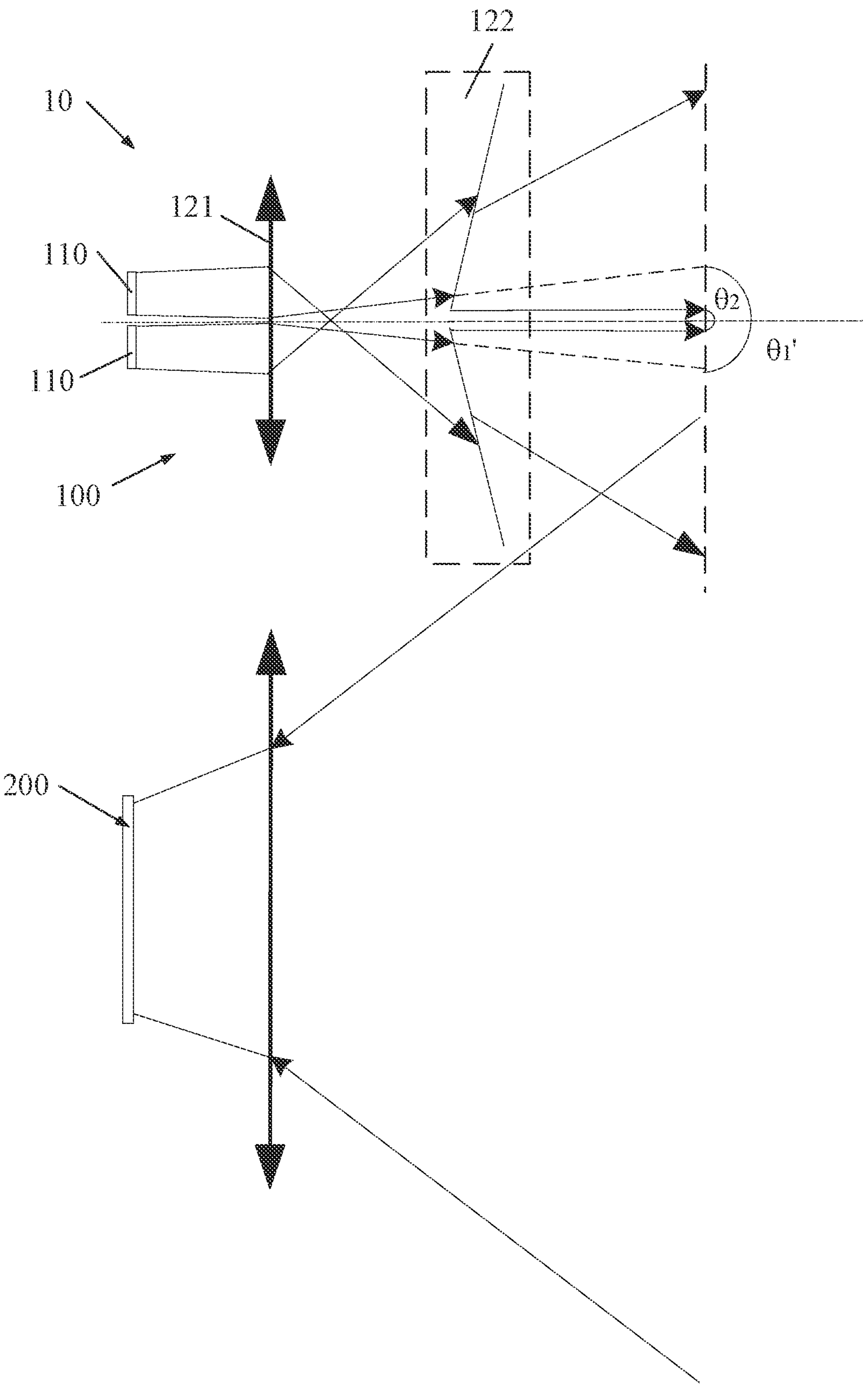
FIG. 15 is a schematic structural diagram of a first LiDAR according to an embodiment of this application.
Figure 16:
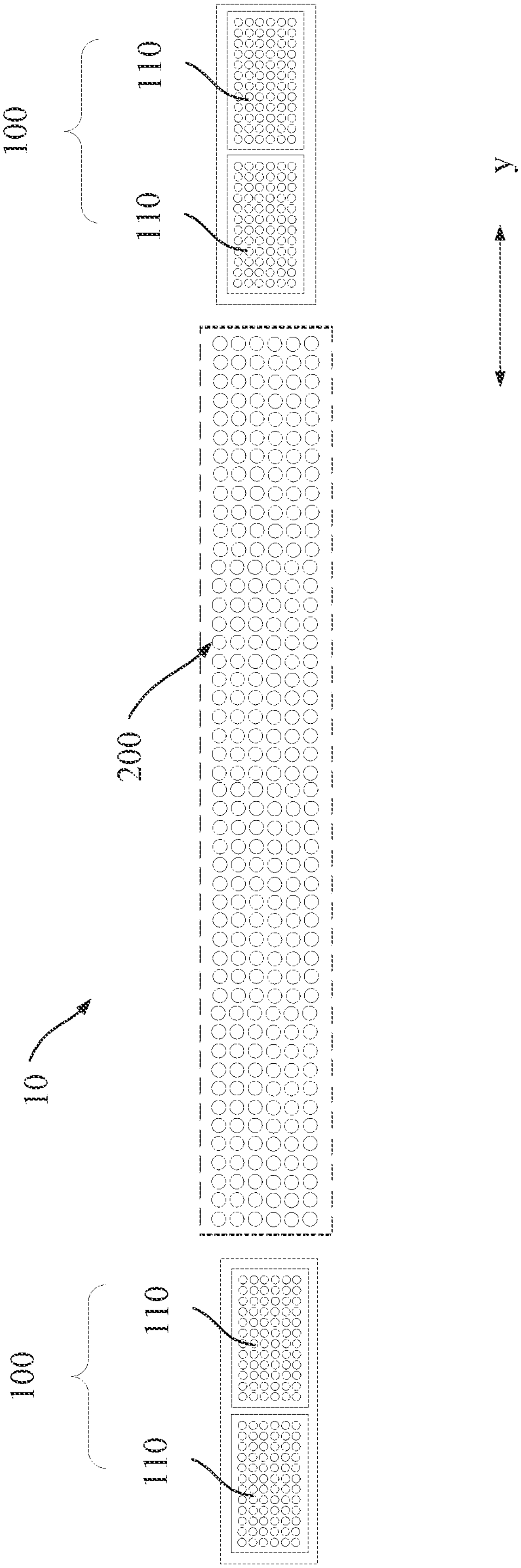
FIG. 16 is a schematic diagram of distribution of a light spot and a pixel of a laser beam emission module and a laser beam receiving module in a second LiDAR according to an embodiment of this application.
Figure 17:
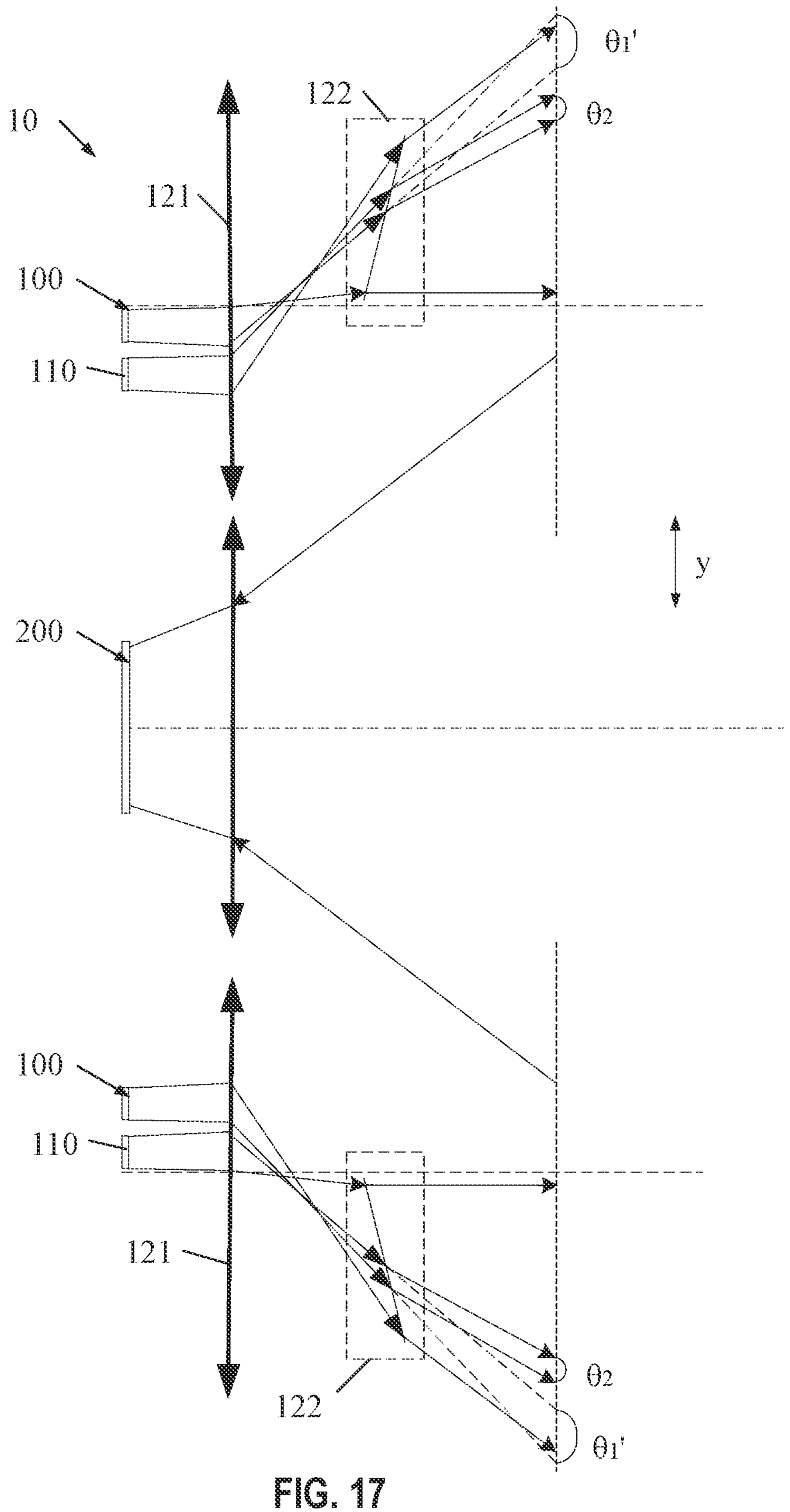
FIG. 17 is a schematic structural diagram of the second LiDAR according to an embodiment of this application.
Figure 18:
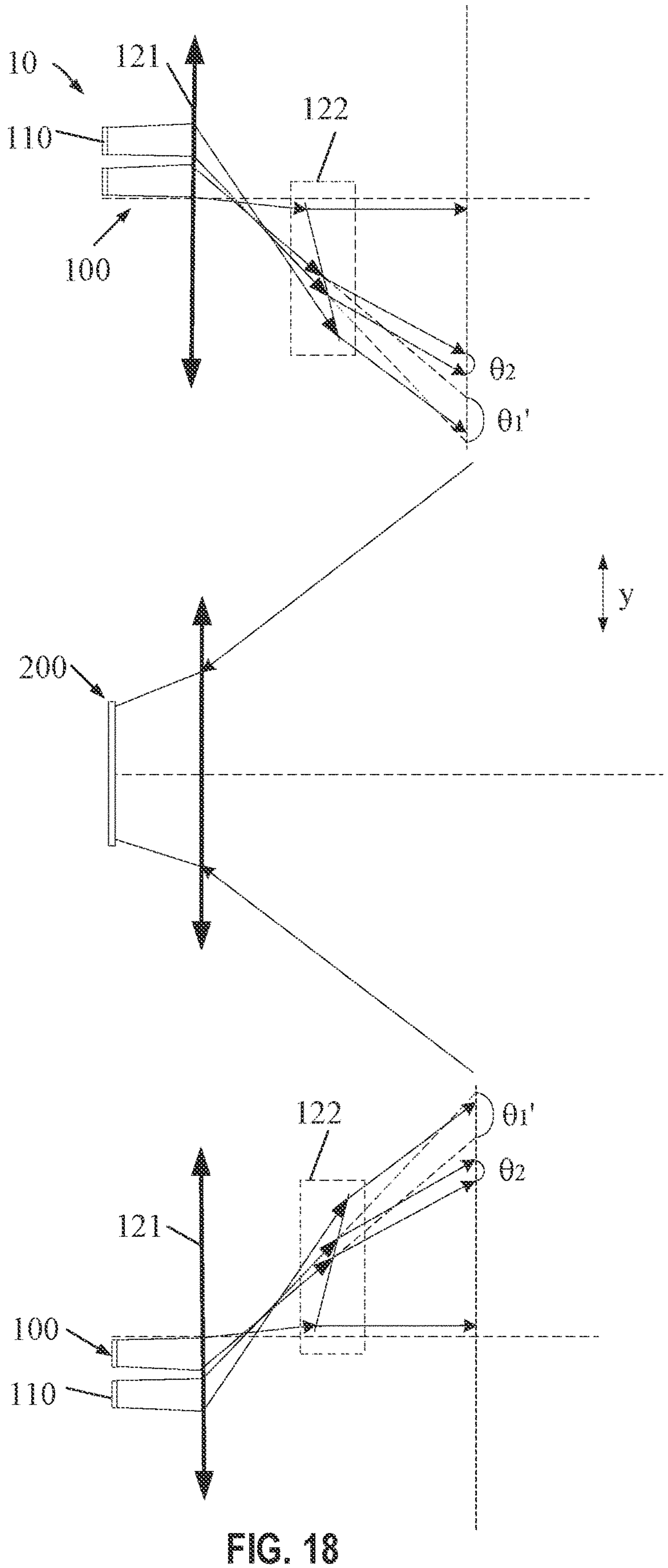
FIG. 18 is a schematic structural diagram of a third LiDAR according to an embodiment of this application.

In some embodiments, the LiDAR 10 may include one or more laser beam emission modules 100. Referring to FIG. 15, in some embodiments, the LiDAR 10 includes one laser beam emission module 100, and an emission angle of view of the laser beam emission module 100 matches a receiving angle of view of the laser beam receiving module 200. Referring to FIG. 16 to FIG. 18, in some embodiments, the LiDAR 10 includes multiple laser beam emission modules 100, and a combination of emission angles of view of the multiple laser beam emission modules 100 matches a receiving angle of view of the laser beam receiving module 200.

As shown in FIG. 15, in some embodiments, when the LiDAR 10 includes a laser beam emission module 100, the laser beam emission module 100 is arranged on one side of the laser beam receiving module 200. In some embodiments, multiple light emission modules 110 included in the laser beam emission module 100 are arranged at intervals along the horizontal direction, and are located on two sides of the first optical axis along the horizontal direction, thereby enlarging the emission angle of view of the laser beam emission module 100 along the horizontal direction. In some embodiments, the multiple light emission modules 110 included in the laser beam emission module 100 are arranged at intervals along the vertical direction, and are located on two sides of the first optical axis along the vertical direction, thereby enlarging the emission angle of view of the laser beam emission module 100 along the vertical direction. In some embodiments, the multiple light emission modules 110 included in the laser beam emission module 100 are arranged at intervals along both the horizontal direction and the vertical direction, and are located on two sides of the first optical axis along both the horizontal direction and the vertical direction, thereby enlarging the emission angle of view of the laser beam emission module 100 along the horizontal direction and the vertical direction.

As shown in FIG. 16 to FIG. 19, in some embodiments, the LiDAR 10 includes two laser beam emission modules 100. The two laser beam emission modules 100 are respectively disposed on two opposite sides of the laser beam receiving module 200 along a horizontal direction, and a combination of emission fields of view of the two laser beam emission modules 100 matches an entire receiving field of view of the laser beam receiving module 200.

Further, as shown in FIG. 17, in some embodiments, multiple light emission modules 110 included in each laser beam emission module 100 are arranged at intervals along the horizontal direction, and are all located on a side of the first optical axis that is closer to the laser beam receiving module 200. Taking each laser beam emission module 100 including two light emission modules 110 as an example, the two light emission modules 110 are arranged at intervals along the horizontal direction, and are both located on the side of the first optical axis that is closer to the laser beam receiving module 200. At this time, in the LiDAR, the multiple light emission modules 110 are arranged at intervals along the horizontal direction, to splice the emission fields of view of the multiple light emission modules 110 and enlarge an emission angle of view of each laser beam emission module along the horizontal direction, thereby enlarging the emission angle of view of the LiDAR along the horizontal direction by combining the emission fields of view of multiple laser beam emission modules.

As shown in FIG. 18, in some embodiments, multiple light emission modules 110 included in each laser beam emission module 100 are arranged at intervals along the horizontal direction, and are all located on a side of the first optical axis that is farther away from the laser beam receiving module 200. Taking each laser beam emission module 100 including two light emission modules 110 as an example, the two light emission modules 110 are arranged at intervals along the horizontal direction, and are both located on the side of the first optical axis that is farther away from the laser beam receiving module 200. At this time, in the LiDAR, the multiple light emission modules 110 are arranged at intervals along the horizontal direction, to splice the emission fields of view of the multiple light emission modules 110 and enlarge an emission angle of view of each laser beam emission module along the horizontal direction, thereby enlarging the emission angle of view of the LiDAR along the horizontal direction by combining the emission fields of view of multiple laser beam emission modules. In addition, because the multiple tight emission modules 110 included in each laser beam emission module 100 are all located on the side of the first optical axis that is farther away from the laser beam receiving module 200 along the horizontal direction, the emission fields of view of the two laser beam emission modules 100 are overlapped in the horizontal direction, and the overlapped region covers a central field of view, so that there is still the laser beam in the central field of view when the LiDAR performs short-distance detection even if there is pixel shifting, to ensure that there is the point cloud in the central field of view of the receiving module, thereby effectively avoiding the lack of the point cloud in the central field of view of the receiving module.

Figure 19:
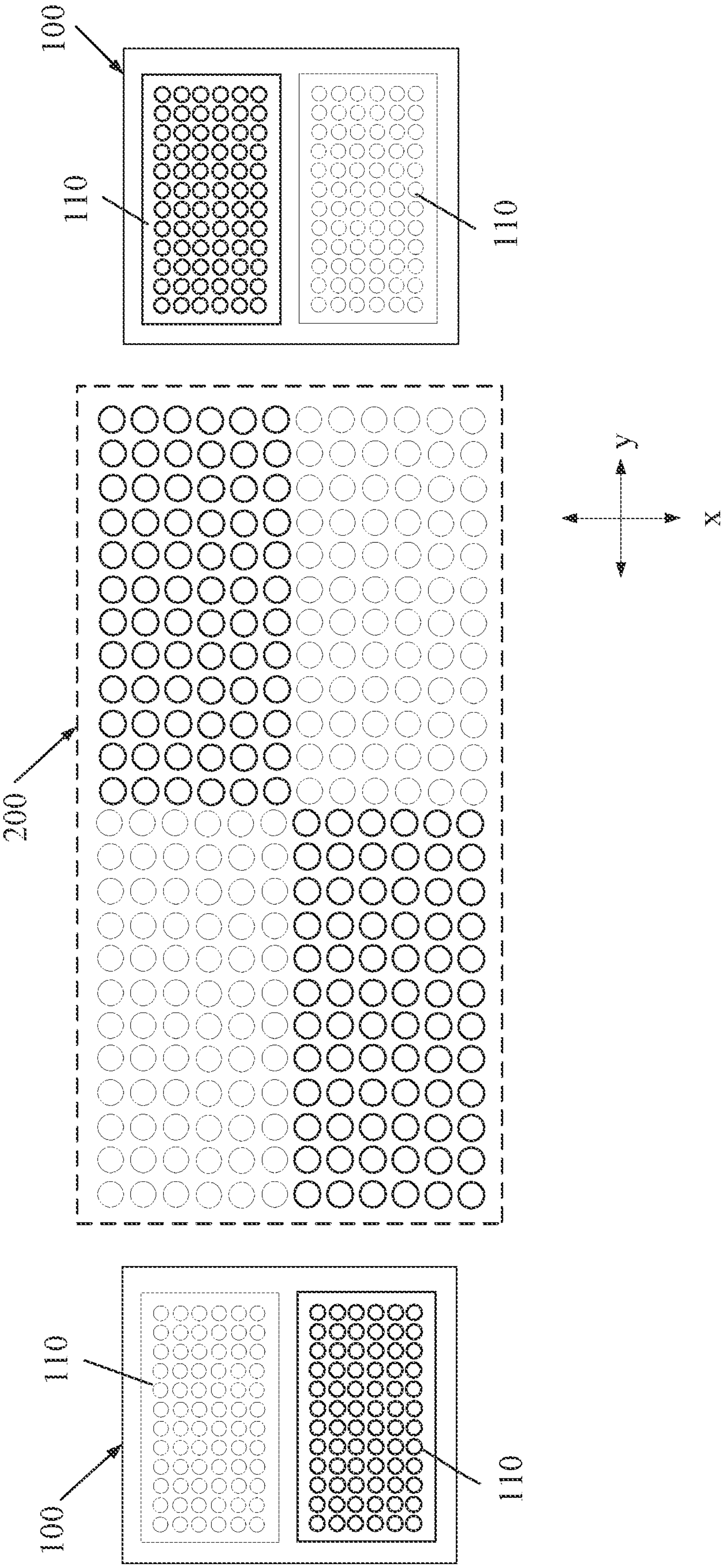
FIG. 19 is a schematic diagram of distribution of a light spot and a pixel of a laser beam emission module and a laser beam receiving module in the second LiDAR and the third LiDAR according to an embodiment of this application.

As shown in FIG. 19, in some embodiments, multiple light emission modules 110 included in each laser beam emission module 100 are arranged at intervals along the vertical direction, and are all located on a side of the first optical axis that is closer to the laser beam receiving module 200 along the horizontal direction, or are located on a side of the first optical axis that is farther away from the laser beam receiving module 200 along the horizontal direction; or the multiple light emission modules 110 are arranged symmetrically on two sides of the first optical axis along the vertical direction. Taking each laser beam emission module 100 including two light emission modules 110 as an example, the two light emission modules 110 are arranged at intervals along the vertical direction, and are separately located on two opposite sides of the first optical axis. At this time, in the LiDAR, the emission fields of view of multiple laser beam emission modules 100 are combined, to enlarge the emission angle of view of the LiDAR along the horizontal direction. At this time, the multiple light emission modules 110 in each laser beam emission module 110 are arranged at intervals along the vertical direction, to splice the emission fields of view in the vertical direction and enlarge an emission angle of view in the vertical direction. In some embodiments, multiple light emission modules 110 included in each laser beam emission module 100 are all arranged at intervals along the horizontal direction and the vertical direction, and are all located on a side of the first optical axis that is closer to the laser beam receiving module 200 along the horizontal direction, or are located on a side of the first optical axis that is farther away from the laser beam receiving module 200 along the horizontal direction. In some embodiments, the multiple light emission modules 110 are arranged symmetrically on two sides of the first optical axis along the vertical direction. Taking each laser beam emission module 100 including four light emission modules 110 as an example, the four light emission modules 110 are arranged into an array, that is, two rows and two columns of light emission modules 110, each row includes two light emission modules 110 arranged at intervals, and each column includes two light emission modules 110 arranged at intervals; and the two rows of light emission modules 110 are respectively located on two sides of the first optical axis along the vertical direction, and the two columns of light emission modules 110 are located on one side of the first optical axis that is closer to the laser beam receiving module 200 along the horizontal direction, or are located on one side of the first optical axis that is farther away from the laser beam receiving module 200 along the horizontal direction. At this time, in the LiDAR, the emission fields of view of multiple laser beam emission modules 110 are combined, to enlarge the emission angle of view of the LiDAR along the horizontal direction. The multiple light emission modules 110 in each laser beam emission module 110 are arranged at intervals along the horizontal direction and the vertical direction, to splice the emission fields of view in the horizontal direction and splice the emission fields of view in the vertical direction, and further enlarge emission angles of view in the horizontal direction and the vertical direction.

In some embodiments, the LiDAR 10 may include at least one of the foregoing laser beam emission modules 100, and may also include multiple laser beam receiving modules 200. When the number of laser beam emission modules 100 is one, an emission field of view of one laser beam emission module 100 matches a combination of receiving fields of view of the multiple laser beam receiving modules 200; or when the number of laser beam emission modules 100 is more than one, a combination of emission fields of view of the more than one laser beam emission modules 100 matches the combination of the receiving fields of view of the multiple laser beam receiving modules 200.

Further, the LiDAR 10 also includes a housing and a translucent protective plate. The housing has an accommodation cavity, a first opening communicating with the accommodation cavity is provided on one side of the housing. The laser beam emission module 100 and the laser beam receiving module 200 are both located in the accommodation cavity, the translucent protective plate can cover the first opening to allow light to enter and exit the accommodation cavity, and at least part of a structure of the light beam adjustment module 130 can be arranged on the translucent protective plate, to simplify a design of the LiDAR 10 and save inner space of the LiDAR 10, thereby implementing a miniaturization design of the LiDAR 10.

In some embodiments, when a projection optical structure in the light beam adjustment module 130 uses a prism, the prism in the light beam adjustment module 130 that is farther away from the light emission module 110 can be reused as at least pan of the structure of the translucent protective plate at the first opening. For example, when the refractive optical structure in the light beam adjustment module 130 includes two refraction portions, the two refraction portions are integrated into a wedge-shaped prism (as shown in FIG. 2), and the wedge-shaped prism can be reused as at least part of the structure of the translucent protective plate at the first opening.

In the description of the present application, it shall be understood that the terms such as "first" and "second" are merely intended for a purpose of description, and shall not be understood as an indication or implication of relative importance. The person skilled in the art can understand specific meanings of the foregoing terms in the present application to a specific situation. In addition, in the descriptions of this application, "a plurality of" means two or more unless otherwise specified. Herein, "and/or" is an association relationship for describing associated objects and indicates that three relationships may exist. For example, A and/or B may mean the following three cases: Only A exists, both A and B exist, and only B exists. The character "/" generally indicates an "or" relationship between the associated objects.

The disclosed forgoing are only exemplary embodiments of the present application, which of course cannot be used to limit the scope of rights of the present application. Therefore, equivalent changes made in accordance with the claims of the present application still fall within the scope of the application.

What is claimed is:

1. A laser beam emission module, comprising:

multiple light emission modules, wherein each light emission module is configured to emit an emission laser beam group, and the emission laser beam group comprises multiple emission laser beams;

an emission lens module, located on a light outgoing side of the multiple light emission modules, configured to reduce a divergence angle of the emission laser beams emitted by the multiple light emission modules, and further configured to increase an emission angle of view of the emission laser beams; and a light beam adjustment module, located on a light outgoing side of the emission lens module and configured to adjust an interval between angles of view of emission laser beams output by the emission lens module, wherein the light beam adjustment module is configured to perform angle deflection or light spot expansion on emission laser beams output by the emission lens module, so that the interval between the angles of view of every two adjacent emission laser beams is less than or equal to a preset value;

wherein the multiple light emission modules are arranged at intervals along a first direction or a second direction, the light beam adjustment module is configured to perform angle deflection or light spot expansion on emission laser beam groups output by the emission lens module along the first direction or the second direction, to reduce an interval between angles of view of two adjacent emission laser beam groups; and wherein the light beam adjustment module comprises:

a refractive optical structure, located on a light outgoing side of the emission lens module and configured to receive the emission laser beam groups output by the emission lens module and refract a light beam, so that each received emission laser beam group is deflected along the first direction or the second direction towards an adjacent emission laser beam group after being refracted by the refractive optical structure.

2. The laser beam emission module according to claim 1, wherein the number of light emission modules is M, M is a positive integer, and M≥2; and the refractive optical structure comprises M refraction portions arranged along the first direction or the second direction, and the M refraction portions are on the light outgoing side of the emission lens module, and are in a one-to-one correspondence with emission laser beam groups emitted by the M light emission modules, wherein an mth refraction portion is configured to receive an emission laser beam group obtained after an emission laser beam group emitted by an mth light emission module is processed by the emission lens module, so that the received emission laser beam group is subject to angle deflection after being refracted, to deflect along the first direction or the second direction towards an adjacent emission laser beam group, wherein m is a positive integer, and 1≤m≤M; or the refractive optical structure comprises M−1 refraction portions arranged along the first direction or the second direction, and the M−1 refraction portions are on the light outgoing side of the emission lens module, are in a one-to-one correspondence with emission laser beam groups emitted by M−1 light emission modules, and are configured to receive emission laser beam groups obtained after the emission laser beam groups emitted by M−1 light emission modules are processed by the emission lens module, so that the received emission laser beam groups are subject to angle deflection after being refracted, to deflect along the first direction or the second direction towards a fixed emission laser beam group, wherein the fixed emission laser beam group is an emission laser beam group output after an emission laser beam group emitted by one light emission module unequipped with the refraction portion correspondingly in the M light emission modules is processed by the emission lens module.

3. The laser beam emission module according to claim 1, wherein the multiple light emission modules are arranged at intervals along a first direction and a second direction, the light beam adjustment module is configured to perform angle deflection or light spot expansion on emission laser beam groups output by the emission lens module along the first direction and the second direction, wherein the first direction intersects with the second direction.

4. The laser beam emission module according to claim 3, wherein the light beam adjustment module comprises:

a first refractive optical structure, located on a light outgoing side of the emission lens module and configured to refract a light beam, so that the emission laser beam groups output by the emission lens module are deflected along the first direction towards an adjacent emission laser beam group after being refracted by the first refractive optical structure; and a second refractive optical structure, located on a light outgoing side of the emission lens module and configured to refract a light beam, so that the emission laser beam groups output by the emission lens module are deflected along the second direction towards an adjacent emission laser beam group after being refracted by the second refractive optical structure, wherein the first refractive optical structure cooperates with the second refractive optical structure.

5. The laser beam emission module according to claim 4, wherein the number of light emission modules is M*N, M is a positive integer, M≥2, N is a positive integer, and N≥2; and the laser beam emission module comprises M rows and N columns of light emission modules;

the first refractive optical structure comprises M first refraction portions arranged along the first direction, and the M first refraction portions are on the light outgoing side of the emission lens module, and are in a one-to-one correspondence with emission laser beam groups emitted by the M rows of light emission modules, wherein an mth first refraction portion is configured to receive an emission laser beam group obtained after an emission laser beam group emitted by an mth row of light emission modules is processed by the emission lens module, so that the received emission laser beam group is subject to angle deflection after being refracted, to deflect along the first direction towards an adjacent emission laser beam group, wherein m is a positive integer, and 1≤m≤M; or the first refractive optical structure comprises M−1 first refraction portions arranged along the first direction, and the M−1 first refraction portions are on the light outgoing side of the emission lens module, are in a one-to-one correspondence with emission laser beam groups emitted by M−1 rows of light emission modules, and are configured to receive emission laser beam groups obtained after the emission laser beam groups emitted by M−1 rows of light emission modules are processed by the emission lens module, so that the received emission laser beam groups are subject to angle deflection after being refracted, to deflect along the first direction towards a fixed row of emission laser beam groups, wherein the fixed row of emission laser beam groups are emission laser beam groups output after emission laser beam groups emitted by one row of light emission modules unequipped with the first refraction portion correspondingly in the M rows of light emission modules are processed by the emission lens module; and the second refractive optical structure comprises N second refraction portions arranged along the second direction, and the N second refraction portions are on the light outgoing side of the emission lens module, and are in a one-to-one correspondence with emission laser beam groups emitted by N columns of light emission modules, wherein an nth second refraction portion is configured to receive an emission laser beam group obtained after an emission laser beam group emitted by an nth column of light emission modules is processed by the emission lens module, so that the received emission laser beam group is subject to angle deflection after being refracted, to deflect along the second direction towards an adjacent emission laser beam group, wherein n is a positive integer, and 1≤n≤N; or the second refractive optical structure comprises N−1 second refraction portions arranged along the second direction, and the N−1 second refraction portions are on the light outgoing side of the emission lens module, are in a one-to-one correspondence with emission laser beam groups emitted by N−1 columns of light emission modules, and are configured to receive emission laser beam groups obtained after the emission laser beam groups emitted by N−1 columns of light emission modules are processed by the emission lens module, so that the received emission laser beam groups are subject to angle deflection after being refracted, to deflect along the second direction towards a fixed column of emission laser beam groups, wherein the fixed column of emission laser beam groups are emission laser beam groups output after emission laser beam groups emitted by one column of light emission modules unequipped with the second refraction portion correspondingly in the N columns of light emission modules are processed by the emission lens module.

6. The laser beam emission module according to claim 1, wherein the light beam adjustment module comprises:

a light uniformizing structure, located on a light outgoing side of the emission lens module and configured to uniformize the emission laser beam groups output by the emission lens module along a first direction or a second direction, to enlarge a light spot size of the emission laser beams and reduce an interval between angles of view of two adjacent emission laser beam groups.

7. A LiDAR, comprising:

a laser beam receiving module and a laser beam emission module, wherein the laser beam emission module comprises:

multiple light emission modules, wherein each light emission module is configured to emit an emission laser beam group, and the emission laser beam group comprises multiple emission laser beams;

an emission lens module, located on a light outgoing side of the multiple light emission modules, configured to reduce a divergence angle of the emission laser beams emitted by the multiple light emission modules, and further configured to increase an emission angle of view of the emission laser beams; and a light beam adjustment module, located on a light outgoing side of the emission lens module and configured to adjust an interval between angles of view of emission laser beams output by the emission lens module, wherein the light beam adjustment module is configured to perform angle deflection or light spot expansion on emission laser beams output by the emission lens module, so that the interval between the angles of view of every two adjacent emission laser beams is less than or equal to a preset value;

wherein the multiple light emission modules are arranged at intervals along a first direction or a second direction, the light beam adjustment module is configured to perform angle deflection or light spot expansion on emission laser beam groups output by the emission lens module along the first direction or the second direction, to reduce an interval between angles of view of two adjacent emission laser beam groups; and wherein the light beam adjustment module comprises:

a refractive optical structure, located on a light outgoing side of the emission lens module and configured to receive the emission laser beam groups output by the emission lens module and refract a light beam, so that each received emission laser beam group is deflected along the first direction or the second direction towards an adjacent emission laser beam group after being refracted by the refractive optical structure.

8. The LiDAR according to claim 7, wherein the number of laser beam receiving modules is one, the number of laser beam emission modules is two, the two laser beam emission modules are on two opposite sides of the laser beam receiving module, and a combination of emission fields of view of the two laser beam emission modules matches a receiving field of view of the laser beam receiving module.

9. The LiDAR according to claim 8, wherein the emission lens module comprises a first optical axis; the two laser beam emission modules are disposed on the two opposite sides of the laser beam receiving module along a second direction; and multiple light emission modules of each laser beam emission module are arranged at intervals along a first direction.

10. The LiDAR according to claim 7, further comprising:

a housing having an accommodating cavity, wherein a first opening communicating with the accommodating cavity is disposed on one side of the housing; and the laser beam emission module and the laser beam receiving module are both located in the accommodating cavity; and a translucent protective plate, wherein the translucent protective plate covers the first opening and is configured to allow light to enter and exit the accommodating cavity, and at least part of a structure of a light beam adjustment module is disposed on the translucent protective plate.

* * * * *